(12) United States Patent
Schaevitz et al.

(10) Patent No.: US 11,782,225 B2
(45) Date of Patent: Oct. 10, 2023

(54) MULTI-FIBER INTERFACE APPARATUS FOR PHOTONIC INTEGRATED CIRCUIT

(71) Applicant: Corning Research & Development Corporation, Corning, NY (US)

(72) Inventors: Rebecca Kayla Schaevitz, Sunnyvale, CA (US); James Scott Sutherland, Painted Post, NY (US); Qi Wu, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/060,842

(22) Filed: Oct. 1, 2020

(65) Prior Publication Data

US 2021/0149128 A1 May 20, 2021

Related U.S. Application Data

(60) Provisional application No. 62/937,434, filed on Nov. 19, 2019.

(51) Int. Cl.
*G02B 6/42* (2006.01)
(52) U.S. Cl.
CPC .......... *G02B 6/4214* (2013.01); *G02B 6/423* (2013.01); *G02B 6/4259* (2013.01)
(58) Field of Classification Search
CPC .................................................... G02B 6/423
See application file for complete search history.

(56) References Cited

U.S. PATENT DOCUMENTS

| | | | |
|---|---|---|---|
| 6,801,693 B1 | 10/2004 | Jacobowitz et al. | |
| 7,358,109 B2 | 4/2008 | Gallup et al. | |
| 8,064,745 B2 * | 11/2011 | Fortusini | G02B 6/34 |
| | | | 385/27 |
| 8,548,287 B2 | 10/2013 | Thacker et al. | |
| 8,803,269 B2 | 8/2014 | Shastri et al. | |
| 9,039,304 B2 | 5/2015 | Ko et al. | |

(Continued)

FOREIGN PATENT DOCUMENTS

| | | |
|---|---|---|
| EP | 3316012 A1 | 5/2018 |
| WO | 2013/048730 A1 | 4/2013 |
| WO | 2018/140057 A1 | 8/2018 |

*Primary Examiner* — Sung H Pak
(74) *Attorney, Agent, or Firm* — Michael E. Carroll, Jr.

(57) ABSTRACT

Multi-fiber interface apparatuses providing a double reflection expanded beam arrangement include one or more substrates being configured to mountably receive a photonic integrated circuit (PIC), a fiber array coupling member mounted to a substrate, optical elements associated with the substrate and/or the fiber array coupling member, and one or more additional features. An additional feature according to certain implementations includes one or more passive substrate alignment features for aligning substrates to promote optical coupling between optical fibers and the PIC. In certain implementations configured for interfacing with printed circuit boards (PCBs), an additional feature includes a recess defined in an optically transmissive substrate in which a PIC is mounted, or includes a recess defined in a PCB into which the PIC is mounted. Various embodiments provide relaxed fiber alignment tolerances with simplified fabrication and system integration capabilities.

21 Claims, 16 Drawing Sheets

(56) References Cited

U.S. PATENT DOCUMENTS

| | | |
|---|---|---|
| 9,285,554 B2 * | 3/2016 | Doany .................. G02B 6/124 |
| 9,442,255 B2 | 9/2016 | Pommer et al. |
| 9,500,821 B2 | 11/2016 | Hochberg et al. |
| 9,703,041 B2 | 7/2017 | Smith et al. |
| 9,791,645 B2 | 10/2017 | Meadowcroft et al. |
| 9,804,334 B2 * | 10/2017 | Israel .................. G02B 6/3692 |
| 9,864,133 B2 | 1/2018 | Patel et al. |
| 9,874,688 B2 | 1/2018 | Doerr et al. |
| 9,946,028 B2 | 4/2018 | Chen et al. |
| 10,222,552 B2 | 3/2019 | Djordjevic et al. |
| 2012/0280344 A1 | 11/2012 | Shastri et al. |
| 2015/0023632 A1 * | 1/2015 | Lan ..................... G02B 6/4214 |
| | | 385/14 |
| 2018/0180829 A1 | 6/2018 | Gudeman |
| 2018/0217341 A1 | 8/2018 | Smith et al. |
| 2018/0259710 A1 | 9/2018 | Stabile et al. |
| 2019/0265421 A1 * | 8/2019 | Ji ............................ G02B 6/30 |
| 2020/0096713 A1 * | 3/2020 | Meister ................ G02B 6/4249 |

* cited by examiner

MULTI-FIBER INTERFACE APPARATUS FOR PHOTONIC INTEGRATED CIRCUIT

RELATED APPLICATIONS

This application claims the benefit of priority under 35 U.S.C. § 119 of U.S. Provisional Application Ser. No. 62/937,434 filed on Nov. 19, 2019, the content of which is relied upon and incorporated herein by reference in its entirety.

BACKGROUND

The disclosure relates generally to apparatuses for coupling optical fibers to photonic integrated circuits.

One of the biggest challenges with optical communication solutions today, especially for silicon photonics and data center applications, is providing low cost, low profile, robust connections. Cost is often directly proportional to the requisite alignment tolerances. Multimode fiber optical interconnections, which typically have lateral alignment tolerances in the 5-10 µm range, have historically been significantly cheaper for connectivity compared to single mode fiber optical interconnections, which typically require sub-1 µm precision. Single mode fiber, however, dominates longer distance signal transmission due to the lower cost of fiber as well as its high bandwidth transmission characteristics. If single mode connectivity were rendered more cost effective (e.g., rivaling the cost of multimode connectivity), then it is anticipated that single mode fiber would be more widely implemented for short distance applications. Silicon photonics is another driver for single mode connectivity.

A photonic integrated circuit (PIC) is a device that integrates multiple (i.e., at least two) photonic functions. Examples of devices that may be integrated in a PIC include low loss interconnect waveguides, power splitters, optical amplifiers, optical modulators, filters, lasers, and detectors. Fiber array units having individual optical fibers positioned in grooves of a V-groove array may be used for interfacing arrays of optical fibers with PICs.

U.S. Pat. No. 9,804,334 to Israel et al. ("Israel") provides an optical coupler for coupling optical fibers to a PIC utilizing an optically transmissive spacer (or 'interposer') arranged between a substrate and the PIC, with each optical path employing a flat turning mirror as well as first and second curved mirrors that provide a double reflection expanded beam arrangement that allows for separation of optical fibers from the PIC. The optical fibers are positioned between a portion of the spacer and a first surface of the substrate, and the PIC is positioned on an opposing second surface of the substrate. The arrangement disclosed by Israel provides relaxed alignment tolerances in three dimensions while maintaining high signal efficiency.

Despite the alignment tolerance relaxation disclosed by Israel, the disclosed arrangement has limited utility due to factors such as difficulties in fabrication and system integration. Need therefore exists in the art for interface apparatuses for PICs that address limitations associated with conventional systems.

SUMMARY

Multi-fiber interface apparatuses according to certain aspects include one or more substrates being configured to mountably receive a photonic integrated circuit (PIC), a fiber array coupling member mounted to a substrate and configured to receive multiple optical fibers, optical elements (e.g., mirrors, lenses, collimators, and/or waveguides) associated with the substrate(s) and/or the fiber array coupling member to provide a double reflection expanded beam arrangement, and at least one additional feature promoting simplified assembly and/or integration with an optoelectronic system. In certain implementations that utilize multiple optically transmissive substrates, the at least one additional feature includes one or more passive substrate alignment features (e.g., vertical pins, face alignment structures, edge alignment structures, etc.) configured to align the substrates and promote optical coupling between the optical fibers and the PIC. Such a configuration permits one substrate to be mounted to a printed circuit board (PCB), another substrate to be mounted to a fiber array coupling member, and the respective substrates to be easily and precisely positioned relative to one another. In certain implementations configured for interfacing with PCBs, an optically transmissive substrate defines a recess into which a PIC is mounted, and/or a PCB defines a recess into which the PIC is mounted.

In one aspect, the disclosure relates to a multi-fiber interface apparatus for a PIC that comprises: a first optically transmissive substrate having a first face and an opposing second face; a second optically transmissive substrate having a third face and an opposing fourth face, and being configured for mountably receiving the PIC; a fiber array coupling member mounted to the first optically transmissive substrate and configured to receive a plurality of optical fibers; and at least one passive substrate alignment feature configured to align the first optically transmissive substrate and the second optically transmissive substrate to promote optical coupling between the plurality of optical fibers and the PIC. The fiber array coupling member comprises a plurality of optical beam turning elements and a plurality of second mirrors.

In certain embodiments, the plurality of second mirrors comprises a plurality of second focusing mirrors. In certain embodiments, the first optically transmissive substrate or the second optically transmissive substrate comprises a plurality of second focusing lenses arranged in an optical path between the plurality of second mirrors and the PIC. In certain embodiments, the multi-fiber interface apparatus further comprises a plurality of first mirrors configured to reflect beams received from the plurality of optical beam turning elements toward the plurality of second mirrors. In certain embodiments, first mirrors of the plurality of first mirrors are arranged in or on the second optically transmissive substrate. In certain embodiments, the first optically transmissive substrate or the second optically transmissive substrate comprises a plurality of first focusing lenses arranged in an optical path between the plurality of first mirrors and the plurality of second mirrors.

In certain embodiments, the first optically transmissive substrate and the second optically transmissive substrate are arranged in a stacked relationship, with the second face abutting the third face. In certain embodiments, the at least one passive substrate alignment feature comprises at least one protrusion or recess associated with the first optically transmissive substrate that is configured to mate with at least one recess or protrusion associated with the second optically transmissive substrate. In certain embodiments, the at least one passive substrate alignment feature comprises a plurality of holes defined in one or more of the first optically transmissive substrate or the second optically transmissive substrate, and a plurality of pins configured to be received by the plurality of holes.

In certain embodiments, the first optically transmissive substrate and the second optically transmissive substrate are arranged in a laterally abutting relationship, with at least one edge of the first optically transmissive substrate abutting at least one edge of the second optically transmissive substrate. In certain embodiments, the at least one passive substrate alignment feature comprises at least one first registration feature of the first optically transmissive substrate that is configured to mate with at least one second registration feature of the second optically transmissive substrate.

In certain embodiments, the fiber array coupling member further comprises a plurality of passive fiber alignment features (e.g., at least one V-groove array) configured to align the plurality of optical fibers with the plurality of optical beam turning elements. In certain embodiments, the plurality of optical beam turning elements comprises a plurality of beam turning mirrors. In certain embodiments, the multi-fiber interface apparatus further comprises a plurality of beam collimating elements arranged between the plurality of optical fibers and the plurality of beam turning mirrors.

In certain embodiments, the plurality of optical beam turning elements comprises beveled ends of the plurality of optical fibers when the plurality of optical fibers are received by the fiber array coupling member.

In certain embodiments, the multi-fiber interface apparatus further comprises a printed circuit board defining a recess configured to receive the PIC, wherein the second optically transmissive substrate is mounted to the printed circuit board with the PIC received by the recess.

In certain embodiments, the multi-fiber interface apparatus further comprises a plurality of electrically conductive first vias defined through the second optically transmissive substrate, wherein the plurality of electrically conductive first vias are accessible along the third face.

In certain embodiments, the second optically transmissive substrate comprises a substrate recess configured to receive the PIC. In certain embodiments, the multi-fiber interface apparatus further comprises a printed circuit board, wherein the second optically transmissive substrate is mounted to the printed circuit board with the PIC received by the substrate recess.

In certain embodiments, a plurality of electrically conductive paths extends through both the first optically transmissive substrate and the second optically transmissive substrate.

In another aspect, the disclosure relates to a multi-fiber interface apparatus for a photonic integrated circuit (PIC) that comprises: an optically transmissive substrate having a first face and an opposing second face, the optically transmissive substrate defining a recess configured to receive a PIC, with the PIC being mountable to the optically transmissive substrate; and a fiber array coupling member mounted to the optically transmissive substrate and configured to receive a plurality of optical fibers, the fiber array coupling member comprising (i) a plurality of optical beam turning elements and (ii) a plurality of second mirrors, configured to promote optical coupling between the plurality of optical fibers and the PIC when the PIC is mounted to the optically transmissive substrate.

In certain embodiments, the multi-fiber interface apparatus further comprises a plurality of second focusing lenses arranged in an optical path between the plurality of second mirrors and the PIC. In certain embodiments, the multi-fiber interface apparatus further comprises a plurality of first mirrors configured to reflect beams received from the plurality of optical beam turning elements toward the plurality of second mirrors. In certain embodiments, the multi-fiber interface apparatus further comprises a plurality of first focusing lenses arranged in an optical path between the plurality of first mirrors and the plurality of second mirrors.

In certain embodiments, the recess is defined through the first face and through less than an entire thickness of the optically transmissive substrate; the fiber array coupling member is mounted to or along the second face of the optically transmissive substrate; and the optically transmissive substrate is configured to be received by a printed circuit board with the PIC being arrangeable in the recess between the substrate and the printed circuit board.

In certain embodiments, the optically transmissive substrate comprises a plurality of electrically conductive vias extending through at least a portion of a thickness of the optically transmissive substrate.

In certain embodiments, the multi-fiber interface apparatus further comprises at least one passive alignment feature configured to align the PIC with the optically transmissive substrate to promote optical coupling between the plurality of optical fibers and the PIC when the PIC is mounted to the optically transmissive substrate.

In certain embodiments, the plurality of optical beam turning elements comprises a plurality of beam turning mirrors. In certain embodiments, the plurality of optical beam turning elements comprises beveled ends of the plurality of optical fibers when the plurality of optical fibers are received by the fiber array coupling member.

In a further aspect, the disclosure relates to a multi-fiber interface apparatus for a PIC that comprises: a printed circuit board defining a recess; an optically transmissive substrate having a first face and an opposing second face, the optically transmissive substrate being mounted along the first face to the printed circuit board; a PIC mounted to the optically transmissive substrate and arranged within the recess; and a fiber array coupling member mounted to the optically transmissive substrate along the second face and configured to receive a plurality of optical fibers, the fiber array coupling member comprising (i) a plurality of optical beam turning elements and (ii) a plurality of second mirrors, configured to promote optical coupling between the plurality of optical fibers and the PIC.

In certain embodiments, the multi-fiber interface apparatus further comprises a plurality of second focusing lenses arranged in an optical path between the plurality of second mirrors and the PIC.

In certain embodiments, the multi-fiber interface apparatus further comprises a plurality of first mirrors configured to reflect beams received from the plurality of optical beam turning elements toward the plurality of second mirrors. In certain embodiments, the multi-fiber interface apparatus further comprises a plurality of first focusing lenses arranged in an optical path between the plurality of first mirrors and the plurality of second mirrors.

In certain embodiments, the optically transmissive substrate comprises a plurality of electrically conductive vias extending through at least a portion of a thickness of the optically transmissive substrate.

In certain embodiments, the multi-fiber interface apparatus further comprises at least one passive alignment feature configured to align the PIC with the optically transmissive substrate to promote optical coupling between the plurality of optical fibers and the PIC.

In certain embodiments, the plurality of optical beam turning elements comprises a plurality of beam turning mirrors. In certain embodiments, the plurality of optical beam turning elements comprises beveled ends of the plurality of optical fibers when the plurality of optical fibers is received by the fiber array coupling member.

In certain embodiments, the optically transmissive substrate comprises a first substrate portion defining the first face and a second substrate portion defining the second face, wherein the first substrate portion and the second substrate portion are joined to one another along a surface arranged between the first face and the second face.

In another aspect, features of any aspects or embodiments disclosed herein may be combined for additional advantage.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the claims. The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1A:
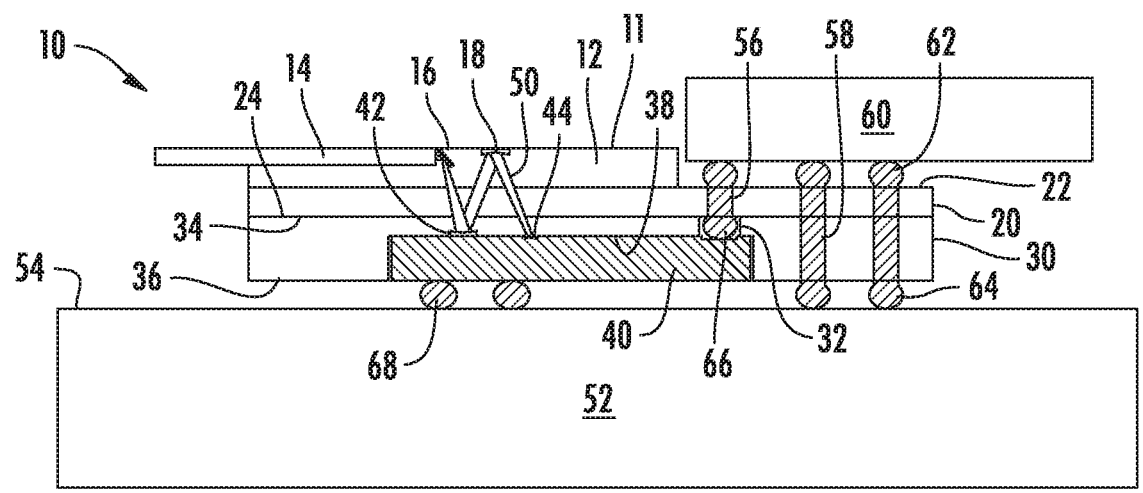
FIG. 1A is a side cross-sectional view of a multi-fiber interface apparatus according to one embodiment including first and second substrates arranged between a fiber array coupling member and a printed circuit board (PCB), with a photonic integrated circuit (PIC) arranged within a recess defined in the second substrate, and optical elements arranged in the fiber array coupling member and along a PIC/substrate interface to provide a double reflection expanded beam arrangement for optically coupling multiple fiber optical fibers to the PIC, with the multi-fiber interface apparatus mounted over a PCB and having a secondary circuit member attached thereto.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As introduced previously, multi-fiber interface apparatuses according to certain aspects include one or more substrates being configured to mountably receive a photonic integrated circuit (PIC), a fiber array coupling member mounted to a substrate and configured to receive multiple optical fibers, and optical elements (e.g., mirrors, lenses, and/or collimators) associated with the substrate(s) and/or the fiber array coupling member to provide a double reflection expanded beam arrangement. Additional features promote simplified assembly and/or integration with an optoelectronic system. In certain embodiments, one or more substrates and/or fiber array coupling members (or components or subassemblies thereof) may be fabricated by photolithographic patterning followed by selective material removal (e.g., chemical etching, reactive ion etching, laser ablation, laser damage and etch, or other microscale removal techniques), stamping (e.g., including precision hot glass pressing) and/or other techniques, with certain features optionally provided by precision pick-and-place techniques. Although traditional V-groove fabrication techniques such as sawing may be used in certain embodiments, the use of features formed by lithographic patterning and removal and/or stamping may be preferable to avoid misalignment that may be increased with increasing numbers of optical fibers within an array. Multi-fiber interface apparatuses disclosed herein may be readily scaled to high volume and high channel count (e.g., from a single fiber to hundreds of fibers) with repeatable fiber alignment.

Figure 1B:
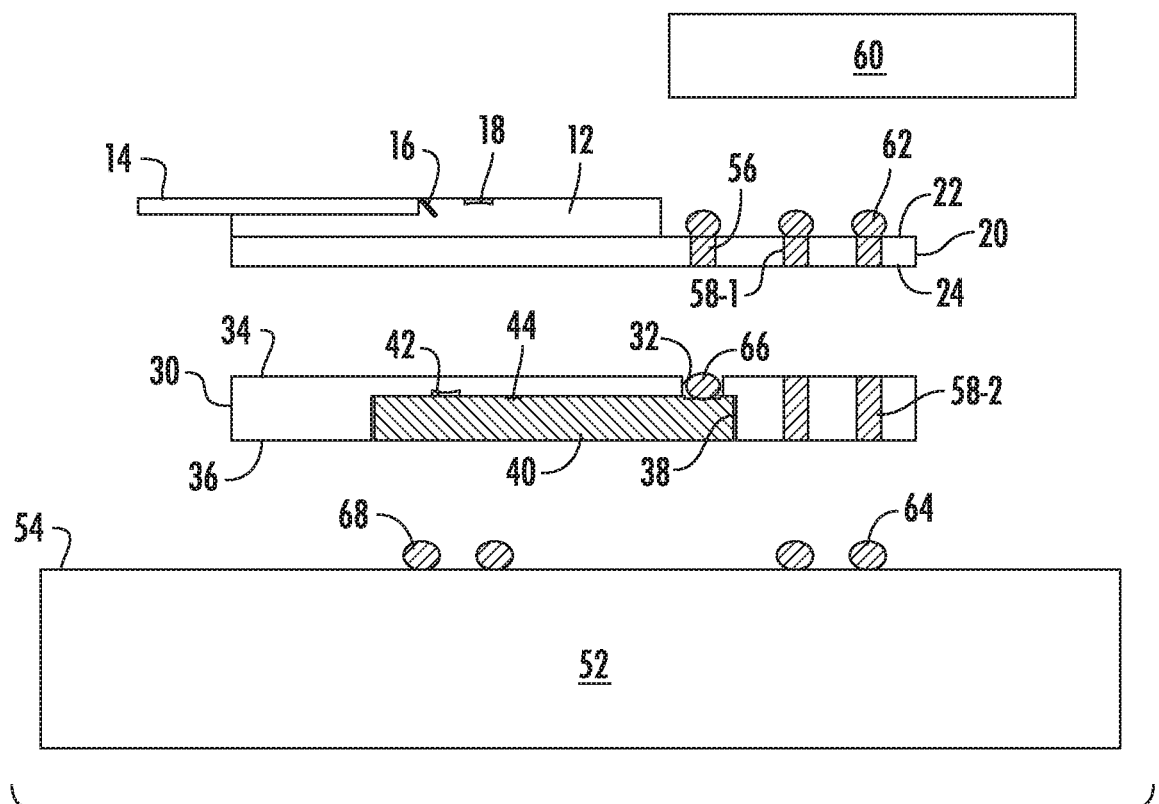
FIG. 1B is a first exploded side cross-sectional view of the multi-fiber interface apparatus of FIG. 1A with the PCB and secondary circuit member of FIG. 1A.
Figure 1C:
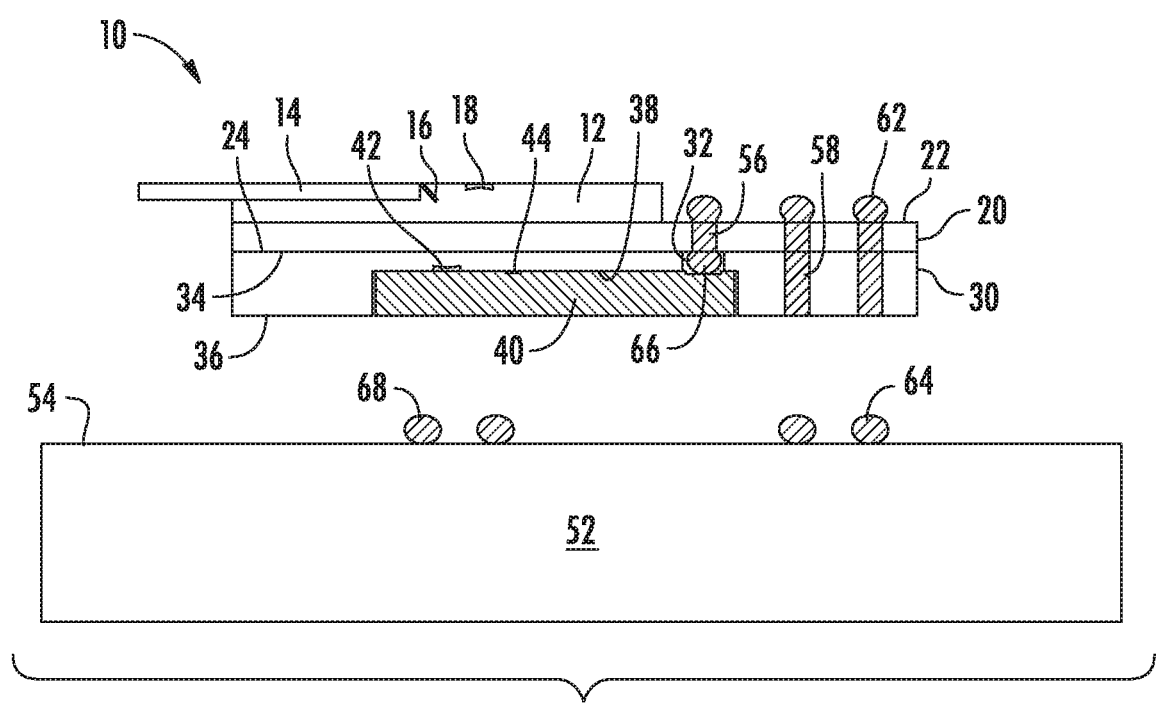
FIG. 1C is a second, partially exploded side cross-sectional view of the multi-fiber interface apparatus of FIG. 1A arranged over the PCB without presence of a secondary circuit member.

FIGS. 1A to 1C illustrate a multi-fiber interface apparatus 10 according to one embodiment having a PIC 40 recessed within a substrate (i.e., second substrate 30). The multi-fiber interface apparatus 10 includes a fiber array coupling member 12, and first and second substrates 20, 30, with the second substrate 30 defining a recess 38 in which the PIC 40 is arranged. Any suitable micromolding or micromachining techniques may be used to fabricate the recess 38. In certain embodiments, the recess 38 may further include raised or recessed features to promote proper alignment of the PIC 40 within the recess 38. The first substrate 20 includes a first surface 22 on which the fiber array coupling member 12 is arranged and includes an opposing second surface 24 arranged in contact with a first surface 34 of the second substrate 30. The second substrate 30 additionally includes a second surface 36 into which the recess 38 is defined. As shown in FIGS. 1A and 1B, the second surface 36 is arranged proximate to a PCB 52, and a secondary circuit member 60 (e.g., an amplifier, a processor, an application specific integrated circuit (ASIC), or any other suitable circuit member) is arranged over first surface 22 of the first substrate 20, laterally adjacent to the fiber array coupling member 12. The fiber array coupling member 12 receives a plurality of optical fibers 14 (although only a single optical fiber 14 is visible in the side cross-sectional views of FIGS. 1A to 1C, it is to be appreciated that numerous optical fibers 14 may be arranged in a side-by-side configuration). The fiber array coupling member 12 also includes a plurality of beam turning elements 16 (e.g., flat turning mirrors) and a plurality of second focusing mirrors 18 (i.e., with each beam turning element 16 and associated second focusing mirror 18 being associated with a different optical fiber of the plurality of optical fibers 14). The beam turning elements 16 are arranged to redirect light from a horizontal to a vertical direction, or vice-versa. Additionally, a plurality of first focusing mirrors 42 is provided to reflect beams received from the plurality of beam turning elements 16 toward the plurality of second focusing mirrors 18. In certain embodiments, the plurality of first focusing mirrors 42 is arranged in or on the second substrate 30. In certain embodiments, the plurality of first focusing mirrors 42 may be arranged in or on the PIC 40. In certain embodiments, the plurality of first focusing mirrors 42 and/or the plurality of second focusing mirrors 18 may be replaced with a combination of a plurality of non-focusing (e.g., flat) mirrors and a plurality of focusing lenses (e.g., defined in or on the first or second substrates 10, 20), as will be recognized by one skilled in the art. The PIC 40 includes a plurality of beam transduction regions 44 (e.g. optionally embodied in photodiodes) along a surface thereof, with the plurality of beam transduction regions 44 being configured to receive beams reflected by the plurality of second focusing mirrors 18 (and/or supply beams to the second focusing mirrors 18 to be received by the optical fibers 14).

In combination, the plurality of beam turning elements 16, the plurality of first focusing mirrors 42, and the plurality of second focusing mirrors 18 provide double reflection expanded beam optical paths for transmitting beams 50 from the plurality of optical fibers 14 to the plurality of beam transduction regions 44 of the PIC 40 (or for transmitting beams 50 from the beam transduction regions 44 of the PIC 40 to be received by the plurality of optical fibers 14). The double reflection expanded beam arrangement provides relaxed alignment tolerances between the optical fibers 14 and the beam transduction regions 44, thereby permitting single mode optical fibers to be used with the multi-fiber interface apparatus 10, if desired. Additionally, the use of beam turning elements 16 permits horizontally arranged optical fibers 14 to be interfaced with a PIC 40 having vertically oriented beam transduction regions 44 in a low profile (i.e., thin) interface apparatus 10.

As shown in FIG. 1A, various electrical connections are provided, such as between the PIC 40 and the PCB 52 (through solder balls 68), between the PIC 40 and the secondary circuit member 60 (through solder ball 66 and one or more conductive vias 56 extending through the first substrate 20), and between the PCB 52 and the secondary circuit member 60 (through solder balls 62, 64 and conductive vias 58 extending through the first and second substrates 20, 30). Provision of the PIC 40 within the recess 38 defined by the second substrate 30 permits regions of the second substrate 30 to be proximate to the PCB 52, thereby enabling direct electrical connection to the PCB 52 by (and through) the second substrate 30—permitting either the size of the PCB 52 to be reduced, or permitting space on the PCB 52 to allocated other uses. FIG. 1B shows that the conductive vias 58 may be composed of via portions 58-1 and 58-2 defined in the first substrate 20 and the second substrate 30, respectively. Although conductive vias are described in connection with various embodiments herein, in certain embodiments these vias may be replaced by electrically conductive posts (e.g., spring posts). In certain embodiments, one or more surfaces of the first and/or second substrates 20, 30 may have electrical traces arranged thereon.

Although solder balls are mentioned in various implementations described herein, it is to be appreciated that any suitable interconnection technique may be used, such as solder balls, solder bumps, electrically conductive paste, or the like.

With continued reference to FIG. 1A, the second surface 36 of the second substrate 30 is arranged proximate to a first surface 54 of the PCB 52, and an opening 32 extending between the first surface 34 of the second substrate 30 and the recess 38 enables the solder ball 66 to create a conductive path through the second substrate 30 to the PIC 40. Although not specifically shown in FIGS. 1A to 1C, the plurality of optical fibers 14 may be arranged in a V-groove array of the fiber array coupling member 12, which may be defined in a top surface 11 of the fiber array coupling member 12. Preferably, at least portions of the fiber array coupling member 12 as well as the first and second substrates 20, 30 through which the beams 50 will be propagated comprise substantially optically transmissive materials, such as glass, silicon, quartz, sapphire, or the like. In certain embodiments, the substrates 20, 30, or at least the second substrate 30 to which the PIC 40 is mounted, may comprises (or may consist essentially of) a material having a coefficient of thermal expansion (CTE) that is substantially matched to (e.g., within a threshold such as 10%, 5%, 3%, 2%, 1%, 0.5%, or 0.1% of) a CTE of the PIC 40. In certain embodiments, the PIC 40 is predominantly fabricated of silicon, and the second substrate 30 comprises glass. In certain embodiments, one or more anti-reflective and/or refractive index matching materials may be provided along interfaces between the fiber array coupling member 12, the first substrate 20, and/or the second substrate 30, to reduce reflection and/or attenuation of the beams 50 when they are transmitted through such interfaces.

In certain embodiments, the second substrate 30 (and associated PIC 40) may be mounted on or over the PCB 52, and the first substrate 20 may be attached to the second substrate 30 thereafter (e.g., after the fiber array coupling member 12 has been attached to the first substrate 20, and after the plurality of optical fibers 14 have been coupled with the fiber array coupling member 12). In this regard, the first and second substrates 20, 30 may serve as an optical surface connector (not an end connector) that maintains a low profile. In certain embodiments, fiducial marks (e.g., crossing lines) may be added to the substrates 20, 30 by an appropriate process (e.g., printing, stamping, engraving, etching, etc.) to assist with subsequent alignment between the substrates 20, 30, which may be aided by optical detection. In certain embodiments, one or more face alignment structures, edge alignment structures, and/or vertically extending pins may be used to promote precise alignment between the substrates 20, 30. In certain embodiments, a combined thickness of the first and second substrates 20, 30 may be less than or equal to about 2 mm, less than or equal to about 1 mm, or less than or equal to about 0.8 mm.

FIG. 1C shows the first and second substrates 20, 30 being affixed to one another prior to mounting to the PCB 52, with the fiber array coupling member 12 being coupled to the first substrate 20 and with the PIC 40 arranged within the recess 38 defined in the second substrate 30. In certain embodiments, the first and second substrates 20, 30 may comprise a unitary substrate member having the fiber array coupling member 12 coupled to a top surface thereof and having the PIC 40 defined within a recess defined in the bottom surface thereof.

Figure 2A:
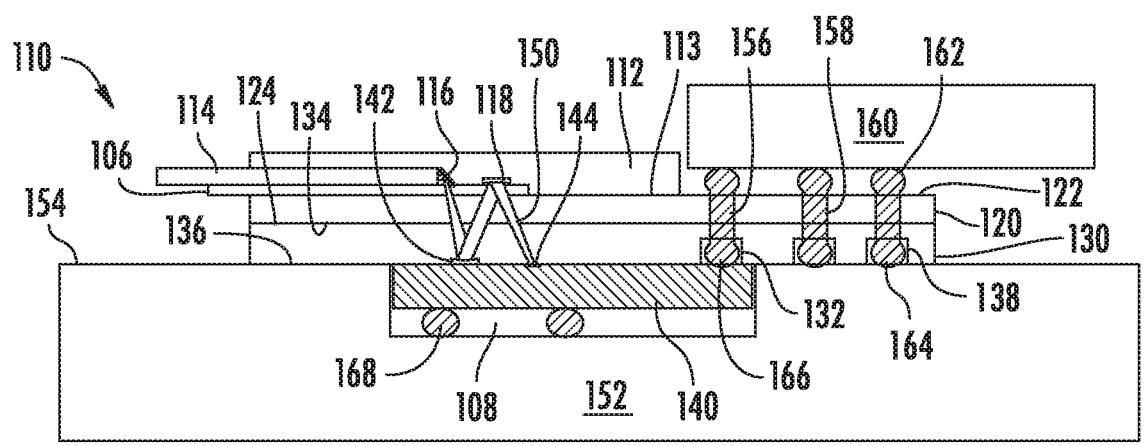
FIG. 2A is a side cross-sectional view of a multi-fiber interface apparatus according to one embodiment including first and second substrates arranged between a fiber array coupling member and a PCB, with a photonic integrated circuit (PIC) arranged within a recess defined in the PCB, and optical elements arranged in the fiber array coupling member and along a PIC/substrate interface to provide a double reflection expanded beam arrangement for optically coupling multiple fiber optical fibers to the PIC.
Figure 2B:
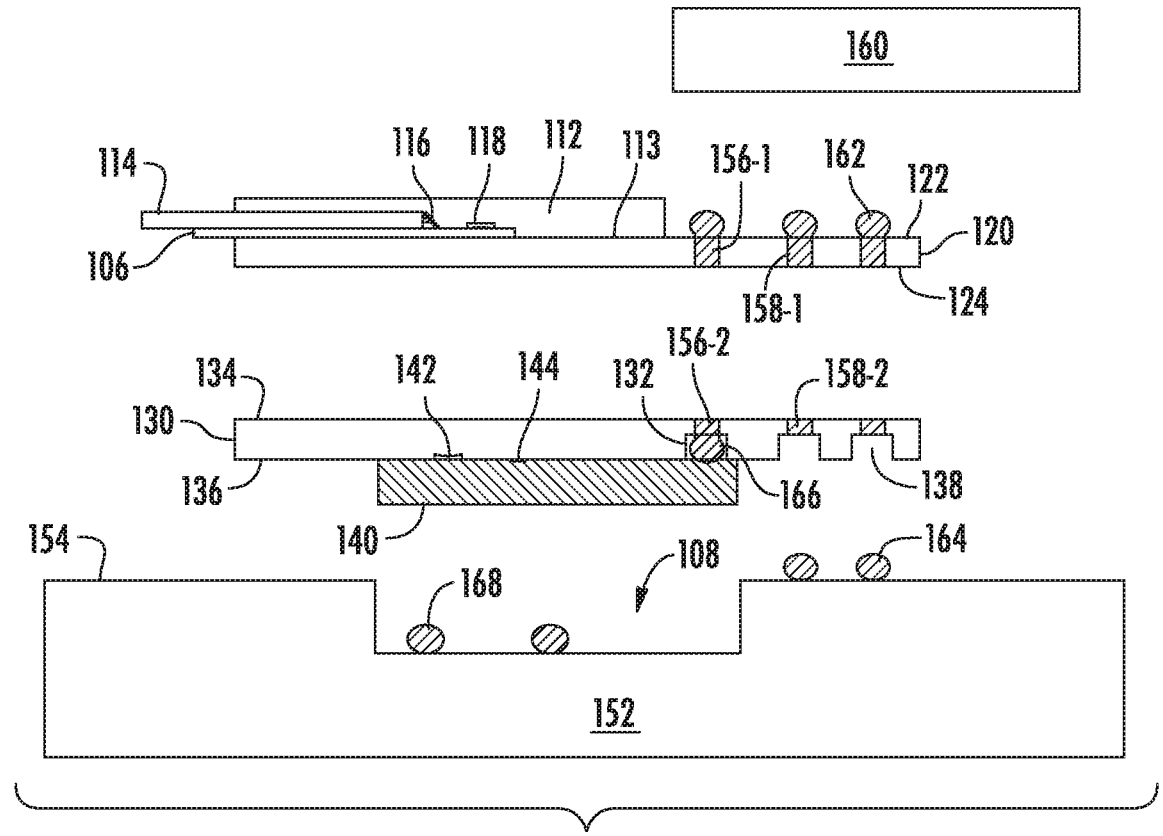
FIG. 2B is an exploded side cross-sectional view of the multi-fiber interface apparatus of FIG. 2A in a state of assembly.

FIGS. 2A and 2B illustrate a multi-fiber interface apparatus 110 according to one embodiment configured for coupling with PIC 140 that is recessed within a PCB 152. The multi-fiber interface apparatus 110 includes a fiber array coupling member 112, and first and second substrates 120, 130. The first substrate 120 includes a first surface 122 on which the fiber array coupling member 112 is arranged and includes an opposing second surface 124 arranged in contact with a first surface 134 of the second substrate 130. The second substrate 130 additionally includes a second surface 136 coupled with the PIC 140, which is arranged in a recess 108 defined in the PCB 152. As shown, a secondary circuit member 160 (e.g., an amplifier, a processor, an ASIC, or any other suitable circuit member) is arranged over the first surface 122 of the first substrate 120, laterally adjacent to the fiber array coupling member 112. The fiber array coupling member 112 receives a plurality of optical fibers 114 and includes a plurality of beam turning elements 116 (e.g., flat turning mirrors) as well as a plurality of second focusing mirrors 118. A fiber array coupling cover 106 is positioned along a lower surface 113 of the fiber array coupling member 112 and is arranged to retain the plurality of optical fibers 114. A plurality of first focusing mirrors 142 is additionally provided to reflect beams received from the plurality of beam turning elements 116 toward the plurality of second focusing mirrors 118. As illustrated, the plurality of first focusing mirrors 142 is arranged in or on the second substrate 130; however, in certain embodiments, the plurality of first focusing mirrors 142 may be arranged in or on the PIC 140. The PIC 140 also includes a plurality of beam transduction regions 144 (e.g. photodiodes) along a surface thereof and being configured to receive beams 150 reflected by the plurality of second focusing mirrors 118 (or to transmit beams from the PIC 140 to the plurality of second focusing mirrors 118 to be received by the plurality of optical fibers 114). In combination, the plurality of beam turning elements 116, the plurality of first focusing mirrors 142, and the plurality of second focusing mirrors 118 provide double reflection expanded beam optical paths for transmitting beams 150 from the plurality of optical fibers 114 to the plurality of beam transduction regions 144 of the PIC 140. In certain embodiments, the plurality of first focusing mirrors 142 and/or the plurality of second focusing mirrors 118 may be replaced with a combination of a plurality of non-focusing (e.g., flat) mirrors and a plurality of focusing lenses, with such lenses being arrangeable in and/or on the first or second substrates 120, 130.

As shown in FIG. 2A, various electrical connections are provided, such as between the PIC 140 and the PCB 152 (through solder balls 168), between the PIC 140 and the secondary circuit member 160 (through solder ball 166 and one or more conductive vias 156 extending through the first substrate 120), and between the PCB 152 and the secondary circuit member (through solder balls 162, 164 and conductive vias 158 extending through the first and second substrates 120, 130). Positioning of the PIC 140 within the recess 108 defined in the PCB 152 permits regions of the second substrate 130 to be proximate to the PCB 152, thereby enabling direct electrical connection to the PCB 152 by (and through) the second substrate 130. FIG. 2B shows that the conductive vias 156, 158 may each be composed of via portions 156-1, 156-2 and 158-1, 158-2 defined in the first substrate 120 and the second substrate 130, respectively. In certain embodiments, one or more surfaces of the first and/or second substrates 120, 130 may have electrical traces arranged thereon. In certain embodiments, the interconnections between the via portions 156-1, 156-2 may be recessed in the first and/or second substrates 120, 130 so that the first and second substrates 120, 130 can be in contact with one another after the via portions 156-1, 156-2 are connected.

With continued reference to FIG. 2A, the second surface 136 of the second substrate 130 is arranged proximate to a first surface 154 of the PCB 152, and a recess 132 defined in the second surface 136 of the second substrate 130 enables one or more solder balls 166 to create a conductive path through the second substrate 130 to the PIC 140. Similarly, recesses 138 defined in the second surface 136 of the second substrate 130 enable solder balls 164 to establish conductive paths from the PCB 152 and through the vias 158 and solder balls 162 to the secondary circuit member 160. Although recesses 132, 138 in the substrate 130 are shown in FIG. 2A, in certain embodiments these recesses 132, 138 may be omitted if the second substrate 130 is spaced apart from the first surface 154 of the PCB 152 by the thickness of the solder balls 164, 166 (e.g., with solder balls arranged on both sides of the recess 108 defined in the PCB 152). In certain embodiments, the depth of the recess 108 in the PCB 152 may be adjusted to compensate for the thickness of solder ball 166 and/or 168 disposed on one or both surfaces of the PIC 140, to allow the solder balls 166 and/or 168 to make contact with pads (not shown) on the bottom of the recess 108 and/or on (or in) the second substrate 130.

In certain embodiments, the plurality of optical fibers 114 may be arranged in a V-groove array (not shown) of the fiber array coupling member 112, which may be defined in the lower surface 113 of the fiber array coupling member 112. Preferably, at least portions of the fiber array coupling member 112, the fiber array coupling cover 106, and the first and second substrates 120, 130 through which the beams 150 will be propagated comprise substantially optically transmissive materials, such as glass, silicon, quartz, sapphire, or the like. In certain embodiments, one or both of the first and second substrates 120, 130 may comprise, or may consists essentially of, a material having a CTE that is substantially matched to a CTE of the PIC 140. In certain embodiments, the PIC 140 is predominantly fabricated of silicon, and one or both of the first and second substrates 120, 130 comprise glass. In certain embodiments, one or more anti-reflective and/or refractive index matching materials (e.g., coatings) may be provided along interfaces between or more of the fiber array coupling member 112, the fiber array coupling cover 106, the first substrate 120, and/or second substrate 130, to reduce reflection and/or attenuation of the beams 150 when they are transmitted through such interfaces.

In certain embodiments, the second substrate 130 (and associated PIC 140) may be mounted to the PCB 152 with the PIC 140 arranged in the recess 108, and thereafter the first substrate 120 may be attached to the second substrate 130 (e.g., after the fiber array coupling member 112 has been attached to the first substrate 120, and after the plurality of optical fibers 114 have been coupled with the fiber array coupling member 112). The first and second substrates 120, 130 may therefore serve as mating surfaces of an optical surface connector.

In certain embodiments, the PIC 140 may be coupled with the second substrate 130, the first and second substrates 120, 130 may be temporarily coupled to one another, the fiber array coupling member 112 (optionally with optical fibers 114 mounted therein) may be coupled with the first substrate 120 to form a subassembly. Thereafter, the subassembly may be tested to verify proper coupling of optical signals between the optical fibers 114 and beam transduction regions 144 of the PIC 140. In certain embodiments, position between the fiber array coupling member 112 and the first substrate 120 may be adjusted responsive to results of the testing, and testing may be performed again to confirm whether sufficient optical coupling has been attained. In certain embodiments, the secondary circuit member 160 may be part of the subassembly subject to being tested. After testing is complete, the first and second substrates 120, 130 may be separated from one another, to permit the second substrate 130 and PIC 140 to be mounted to a PCB 152, followed by coupling between the first and second substrates 120, 130. The ability to test an entire optical subassembly prior to mounting to a PCB and integration within an electro-optical system reduces subsequent quality control and troubleshooting burdens.

As noted previously, various alignment structures (e.g., face alignment structures, edge alignment structures, and/or vertically extending pins) may be used between substrates to ensure that substrates are properly positioned relative to one another for efficient and reliable optical coupling. In certain embodiments, face alignment structures may be placed between first and second substrates of a fiber array coupling member to promote proper alignment between substrates.

In one embodiment, pin guide holes or edge alignment features may be formed using ultrafast laser assisted etching process and ablation process, of which both are capable of creating mechanical features with sub-1 μm accuracy on various materials including glass. Lithographic fiducials may be placed on the glass substrates for marking the location of the holes/alignment features. Because of the loose lateral alignment tolerance of expanded beam coupling system, the inner diameter of pin guide holes may be larger than the diameter of the guide pins (e.g., by 2 um to 4 um) to enable a smooth fit. This is in contrast to pin tolerances for conventional single mode fiber connector, where hole-to-pin tolerances of 0.5-1.0 um are typically required. The use of very tight hole-to-pin tolerances would increase the likelihood of over-constraining alignment of a pair of pins to a mating pair of holes, resulting in racking and potential damage to the glass hole edges or the guide pin. Relaxed lateral alignment tolerances associated with the expanded beam approach disclosed herein helps avoid this over-constrained condition. When guide pins are used, at least two guide pins should be provided for substrate alignment. In such an embodiment, guide pin diameters can be in a range of from 0.5 mm to 2.0 mm. In certain embodiments, guide pins disclosed herein may use a design similar to conventional multi-fiber push on (MPO) connectors, which pins have a diameter of 0.7 mm. In certain embodiments, guide pin holes can be flared to help passively align pins to holes during insertion.

Figure 3A:
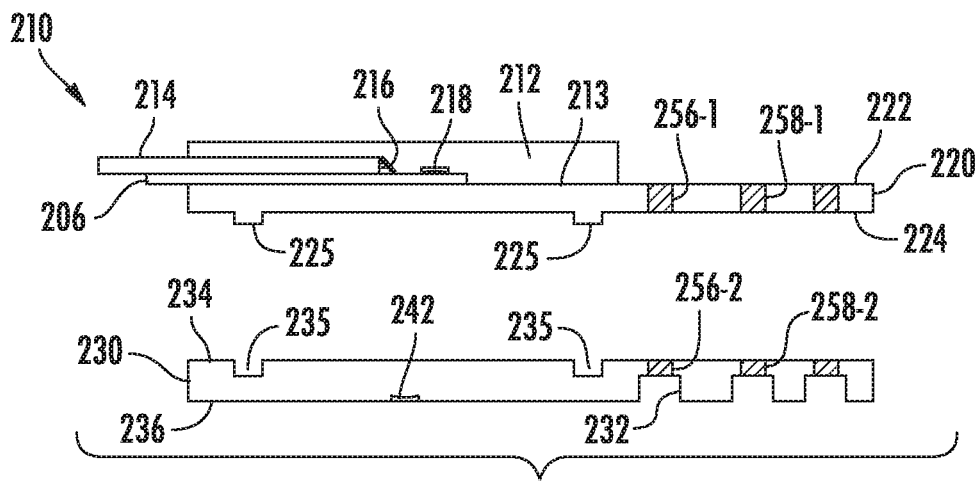
FIG. 3A is a side cross-sectional view of a multi-fiber interface apparatus subassembly according to one embodiment in a state of fabrication including first and second substrates having face alignment structures serving as substrate alignment features and including a fiber array coupling member mounted to the first substrate.
Figure 3B:
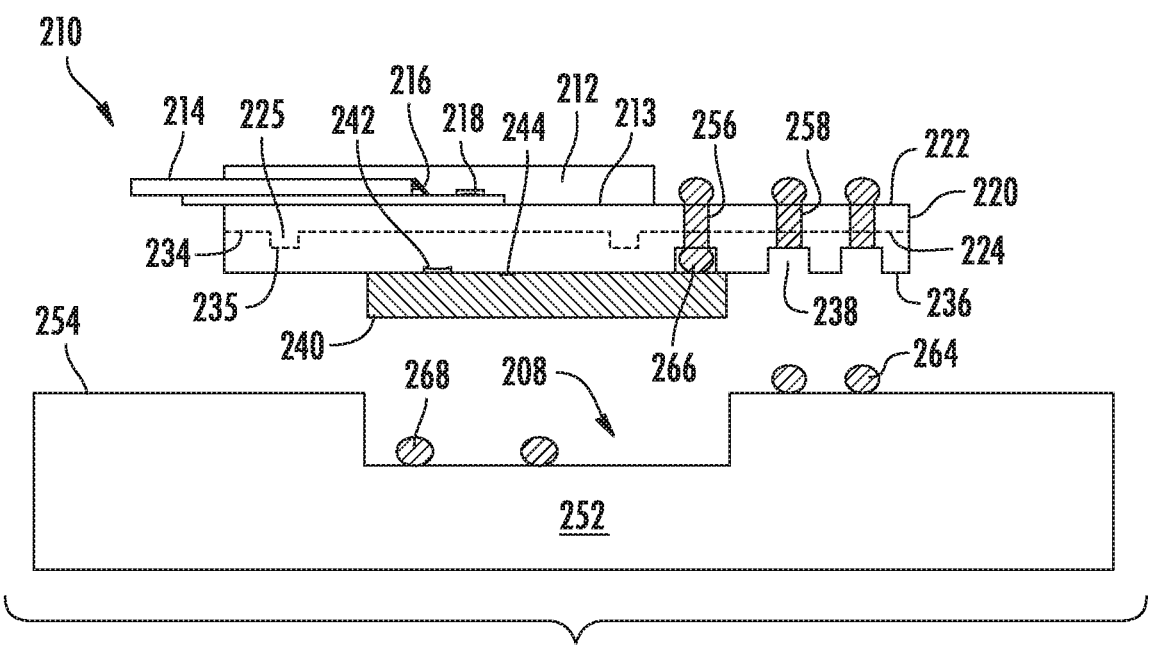
FIG. 3B is a partially exploded side cross-sectional view of a multi-fiber interface apparatus including the subassembly of FIG. 3A, showing a PIC mounted to a lower surface of the second substrate and showing a PCB defining a recess configured to receive the PIC.

One example of a fiber array coupling member incorporating face alignment structures between two substrates is shown in FIGS. 3A and 3B. Such figures illustrate a multi-fiber interface apparatus 210 that includes a fiber array coupling member 212 as well as first and second substrates 220, 230. FIG. 3B additionally shows a PIC 240, as well as a PCB 252 for receiving the second substrate 230 and defining a recess 208 (e.g., recessed relative to an upper PCB surface 254) into which the PIC 240 is received. With reference to FIGS. 3A and 3B, the first substrate 220 includes a first surface 222 on which the fiber array coupling member 212 is arranged and includes an opposing second surface 224 with two protruding face alignment features 225. The second substrate 230 includes a first surface 234 defining two recessed face alignment features 235 that are configured to receive the protruding alignment features 225 and includes an opposing second surface 236 to which a PIC 240 (shown in FIG. 3B) may be mounted. The fiber array coupling member 212 receives a plurality of optical fibers 214 and includes a plurality of beam turning elements 216 (e.g., flat turning mirrors) as well as a plurality of second focusing mirrors 218. A fiber array coupling cover 206 is positioned along a lower surface 213 of the fiber array coupling member 212 and is arranged to retain the plurality of optical fibers 214. A plurality of first focusing mirrors 242 is additionally provided to reflect beams received from the plurality of beam turning elements 216 toward the plurality of second focusing mirrors 218. As illustrated, the plurality of first focusing mirrors 242 is arranged in or on the second substrate 230; however, in certain embodiments, the plurality of first focusing mirrors 242 may be arranged in or on the PIC 240 (of FIG. 3B). The PIC 240 also includes a plurality of beam transduction regions 244 (e.g. photodiodes) along a surface thereof and being configured to receive beams reflected by the plurality of second focusing mirrors 218 (or to transmit beams from the PIC 240 to the plurality of second focusing mirrors 218 to be received by the plurality of optical fibers 214). In combination, the plurality of beam turning elements 216, the plurality of first focusing mirrors 242, and the plurality of second focusing mirrors 218 provide double reflection expanded beam optical paths for transmitting beams (not shown) between the plurality of optical fibers 214 and the plurality of beam transduction regions 244 of the PIC 240. In certain embodiments, the plurality of first focusing mirrors 242 and/or the plurality of second focusing mirrors 218 may be replaced with a combination of a plurality of non-focusing (e.g., flat) mirrors and a plurality of focusing lenses.

FIGS. 3A and 3B show that various electrical connections may be made by the multi-fiber interface apparatus 210 and between elements thereof. For example, electrical connections may be made between the PIC 240 and the PCB 252 (through solder balls 268), between the PIC 240 and a secondary circuit member (not shown) mountable to the first substrate 220 (through solder ball 266 and one or more conductive vias 256 extending through the first substrate 220), and between the PCB 252 and a secondary circuit member (not shown) (i.e., through solder balls 264 and conductive vias 258 extending through the first and second substrates 220, 230). Positioning of the PIC 240 within the recess 208 defined in the PCB 252 permits regions of the second substrate 230 to be proximate to the PCB 252, thereby enabling direct electrical connection to the PCB 252 by (and through) the second substrate 230. FIG. 3A shows that the conductive vias 256, 258 may each be composed of via portions 256-1, 256-2 and 258-1, 258-2 defined in the first substrate 220 and the second substrate 230, respectively. In certain embodiments, one or more surfaces of the first and/or second substrates 220, 230 may have electrical traces arranged thereon. Additionally, recesses 232, 238 defined in the second surface 236 of the second substrate 230 may be provided to accommodate presence of solder balls 266, 264 providing electrical connections to the PIC 240 and the substrate 252, respectively.

In certain embodiments, vertically extending pins may cooperate with (e.g., extending through) first and second substrates of a fiber array coupling member to promote proper alignment between substrates.

Figure 4A:
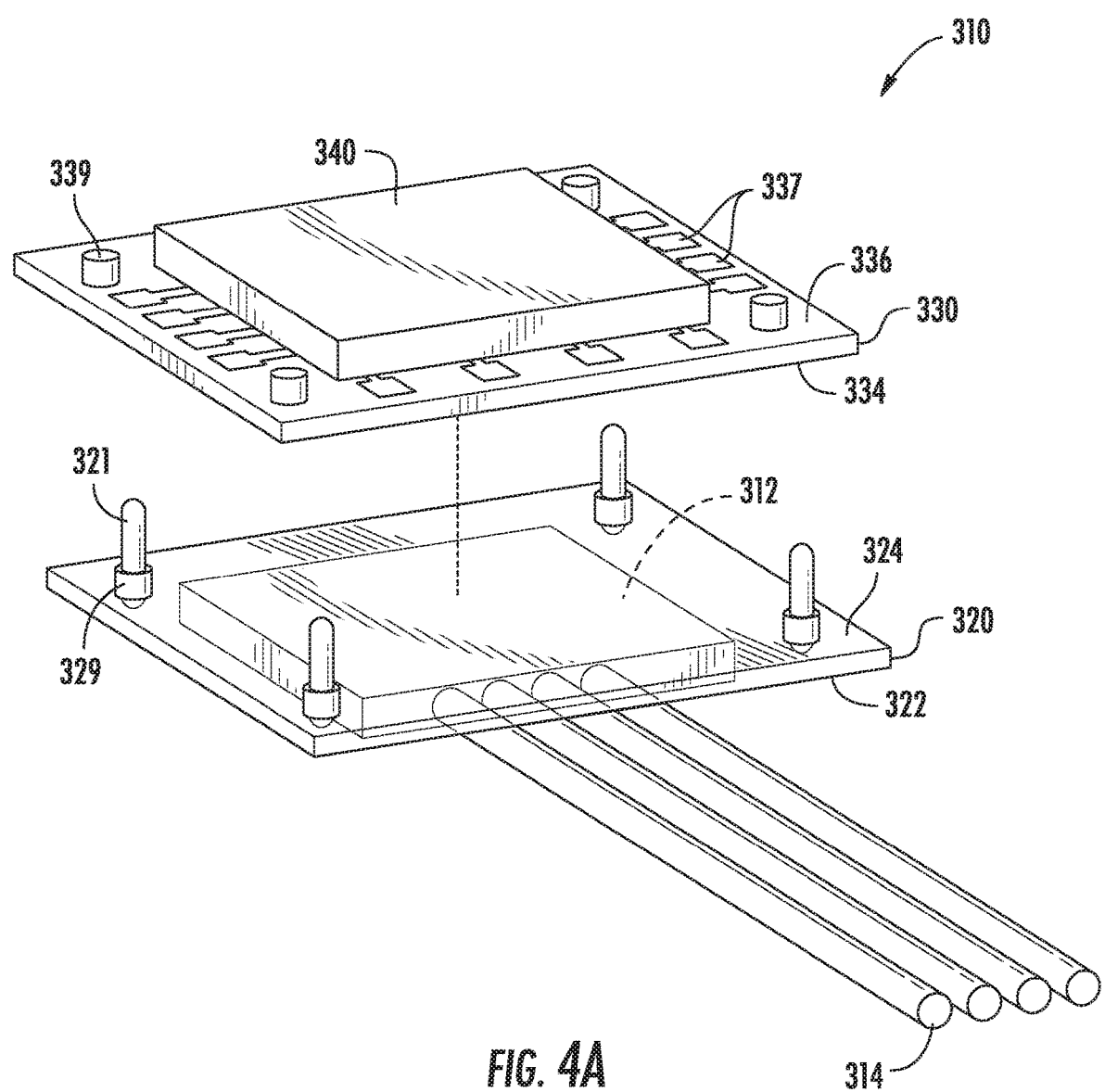
FIG. 4A is a partially exploded perspective view of a multi-fiber interface apparatus according to one embodiment including first and second substrates configured to be aligned with one another using vertically extending pins, with a fiber array coupling member mounted to the first substrate and with a PIC mounted to the second substrate.
Figure 4B:
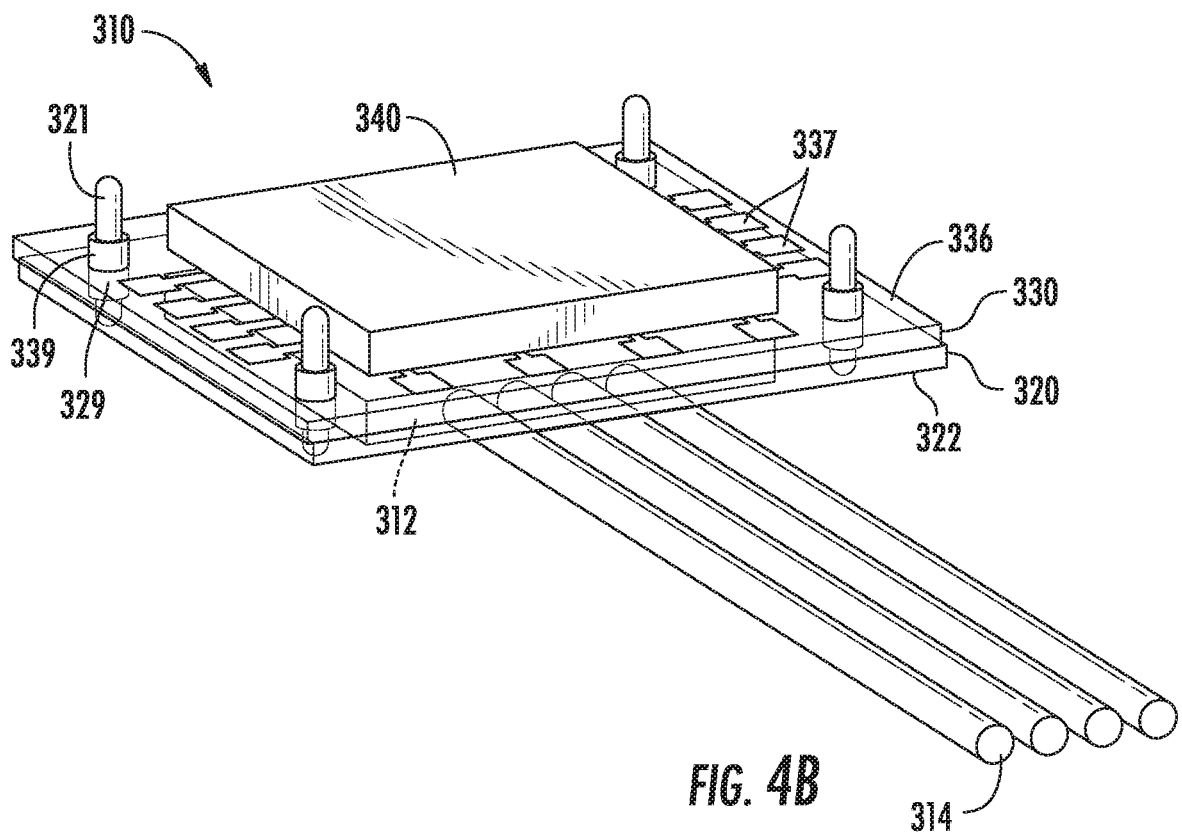
FIG. 4B is a perspective view of the multi-fiber interface apparatus of FIG. 4A.
Figure 4C:
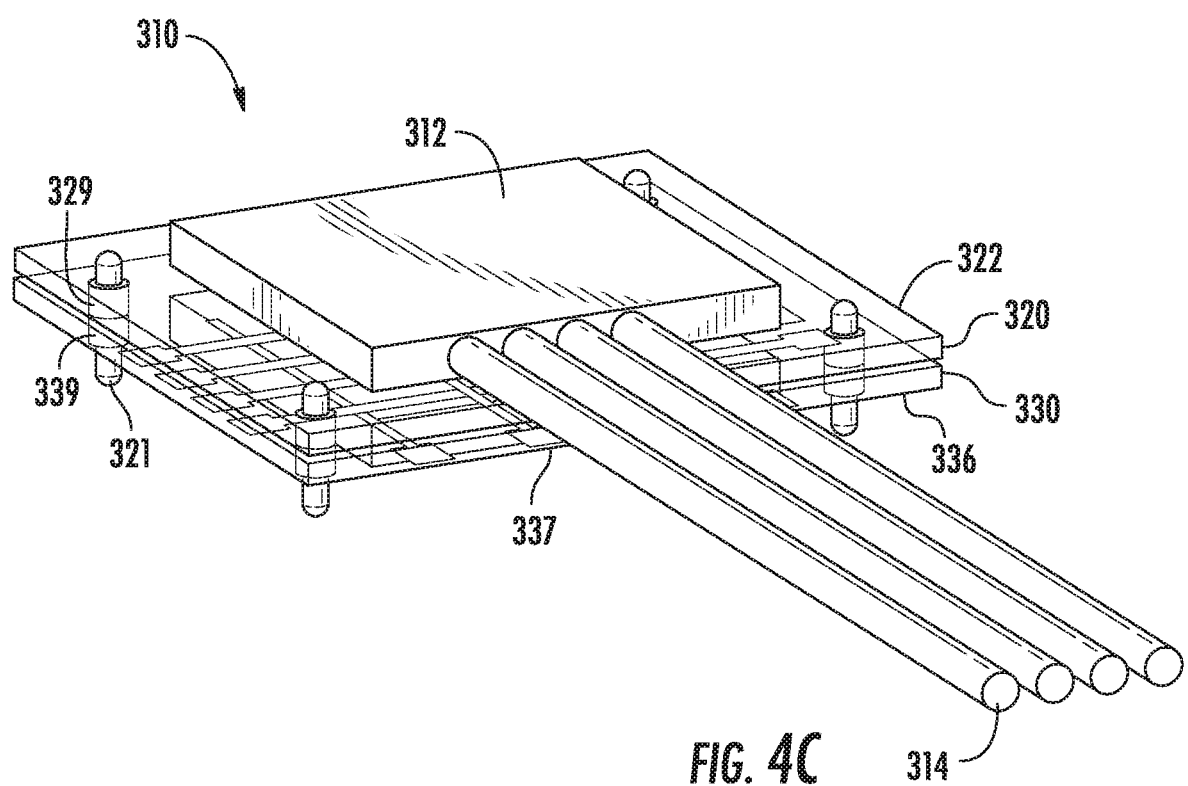
FIG. 4C is a perspective view of the multi-fiber interface apparatus of FIG. 4B, flipped vertically relative to the view shown in FIG. 4B.

FIGS. 4A-4C provide perspective views (with FIG. 4A being a partially exploded perspective view) of a multi-fiber interface apparatus 310 according to one embodiment that includes first and second substrates 320, 330 configured to be aligned with one another using vertically extending pins 321. A fiber array coupling member 312 is mounted to the first substrate 320 and a PIC 340 is mounted to the second substrate 330. The first substrate 320 includes opposing first and second surfaces 322, 324, with multiple (e.g., at least two, but preferably four as illustrated) holes 329 extending between the first and second surfaces 322, 324, and corresponding vertical pins 321 extending through the holes 329. The fiber array coupling member 312 is arranged along the first surface 322, with optical fibers 314 received by the fiber array coupling member 312. The second substrate 330 includes opposing first and second surfaces 334, 336, with four holes 339 extending between the first and second surfaces 334, 336 and being configured to receive the vertical pins 321 when the first and second substrates 320, 330 are mated to one another. The PIC 340 and electrical traces 337 are provided along the second surface 336 of the second substrate 330. As shown, the first and second substrates 320, 330 are fabricated of optically transmissive material (e.g., glass, silicon, etc.) to enable optical signals to be coupled through the substrates 320, 330 between the fiber array coupling member 312 and the PIC 340. Although not specifically illustrated in FIGS. 4A-4C, it is to be appreciated that items such as beam turning elements, and focusing mirrors (or mirrors and focusing lenses) may provide double reflection expanded beam optical paths for transmitting beams between the optical fibers 314 and the PIC 340, in a manner as described previously herein.

Figure 5A:
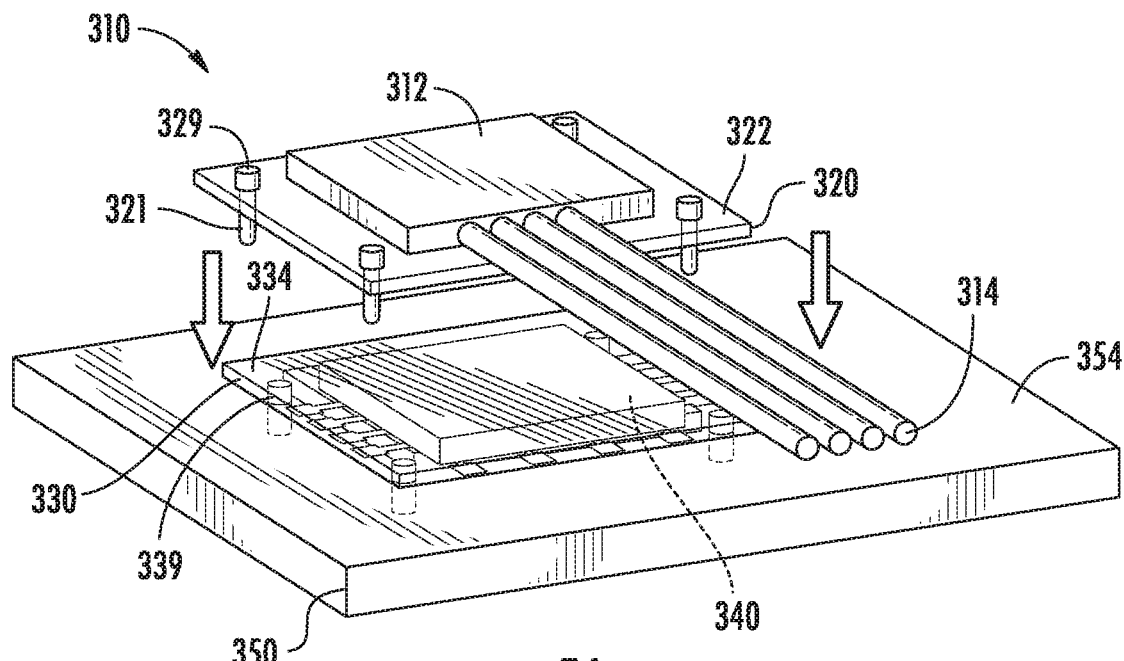
FIG. 5A is a partially exploded perspective view of the multi-fiber interface apparatus of FIGS. 4A-4C and a PCB, with the second substrate and PIC received by the PCB, prior to mating of the first substrate (bearing a fiber array coupling member) with the second substrate.
Figure 5B:
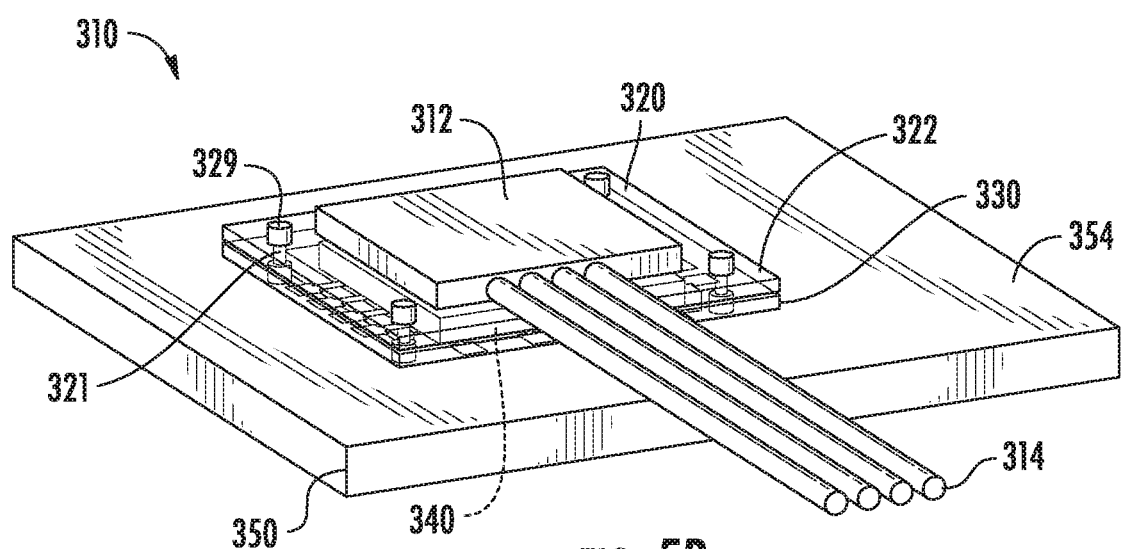
FIG. 5B is a perspective view of the multi-fiber interface apparatus and PCB of FIG. 5A following assembly.

As shown in FIGS. 5A and 5B, the multi-fiber interface apparatus 310 may be mounted to a PCB 350, and the PIC 340 may be arranged in a recess formed by the PCB 350 and/or the second substrate 330. FIG. 5A is a partially exploded perspective view of the multi-fiber interface apparatus 310, with the second substrate 330 attached to a first surface 354 of the PCB 350, prior to mating of the first substrate 320 to the second substrate 330. Electrical traces of the second substrate 330 are oriented downward toward the first surface 354 of the PCB 350. As shown, the fiber array coupling member 312 is arranged along the first surface 322 of the first substrate 320 with multiple optical fibers 314 received by the fiber array coupling member 312. Vertically extending pins 321 extend downward from the first substrate 320 and are registered with holes 339 defined in the second substrate 330. After the first substrate 320 and affixed fiber array coupling member 312 are pressed downward to cause the vertically extending pins 321 to be received by the holes 339 defined in the second substrate 330, respective surfaces of the first and second substrates 320, 330 abut one another, and double reflection expanded beam optical paths are provided for transmitting beams between the optical fibers 314 and the PIC 340.

In certain embodiments, a multi-fiber interface apparatus may be configured to receive electrical conductors (e.g., wires), which may be associated with optical fibers such as by emanating from a common electro-optical cable. For instance, one or more substrates of a multi-fiber interface apparatus may include electrical terminals to which electrical conductors may be coupled, such as to permit electrical connection between the conductors and a PIC and/or other electrical components.

Figure 5C:
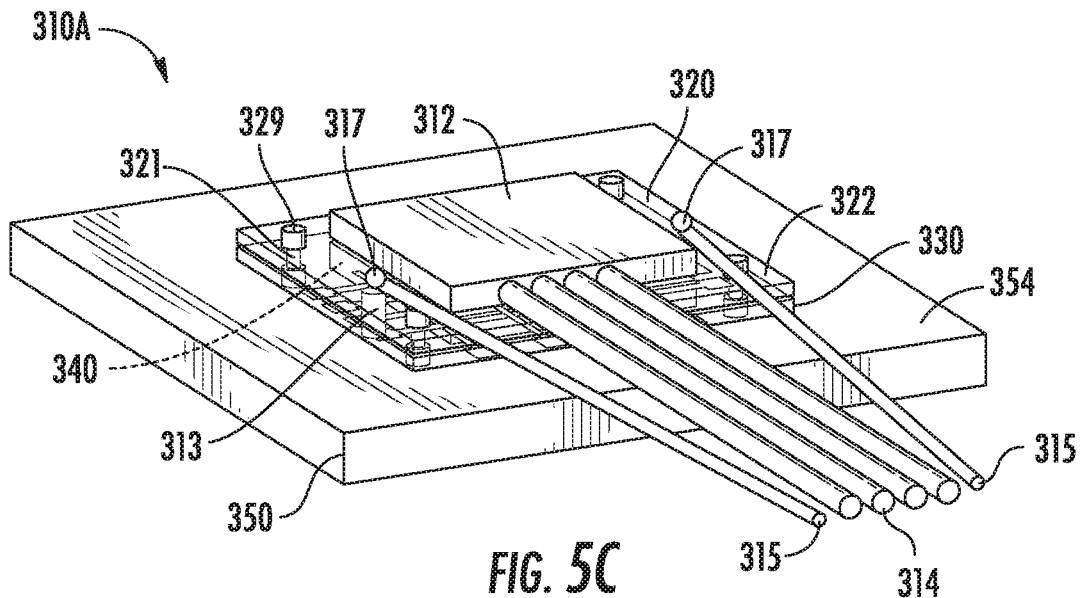
FIG. 5C is a perspective view of a multi-fiber interface apparatus and PCB similar to those illustrated in FIGS. 5A-5B with the addition of electrical terminals on the first substrate to which wires associated with the optical fibers are coupled.

FIG. 5C is a perspective view of a multi-fiber interface apparatus 310A and PCB 350 similar to those illustrated in FIGS. 5A-5B, with addition of electrical terminals 313 on the first substrate 320 to which wires 315 associated with the optical fibers 314 are coupled. The electrical terminals 313 may embody or include conductive vias that extend through an entire thickness of the first substrate 320, to propagate electrical signals to and/or through the second substrate 330 of the multi-fiber interface apparatus 310 to which the first substrate 320 is attached. Electrical traces of the second substrate 330 are oriented downward toward the first surface 354 of the PCB 350, with the PIC 340 being attached to the second substrate 330 and arranged within a recess formed in the PCB 350 and/or the second substrate 330. As shown, the fiber array coupling member 314 is arranged along the first surface 322 of the first substrate 320 with multiple optical fibers 314 received by the fiber array coupling member 312. Vertically extending pins 321 extend downward from the first substrate 320 and are registered with holes 339 defined in the second substrate 330. In combination, the fiber array coupling member 312 and the first and second substrates 320, 330 provide double reflection expanded beam optical paths for transmitting beams between the optical fibers 314 and the PIC 340.

In certain embodiments, the electrical terminals 313 could also be used as alignment pins to align the first and second substrates 320, 330. In certain embodiments, one or more substrates of a multi-fiber interface apparatus may be electrically coupled with a substrate (e.g., via solder balls), regardless of whether a PIC is or is not independently electrically coupled with the substrate.

Figure 6:
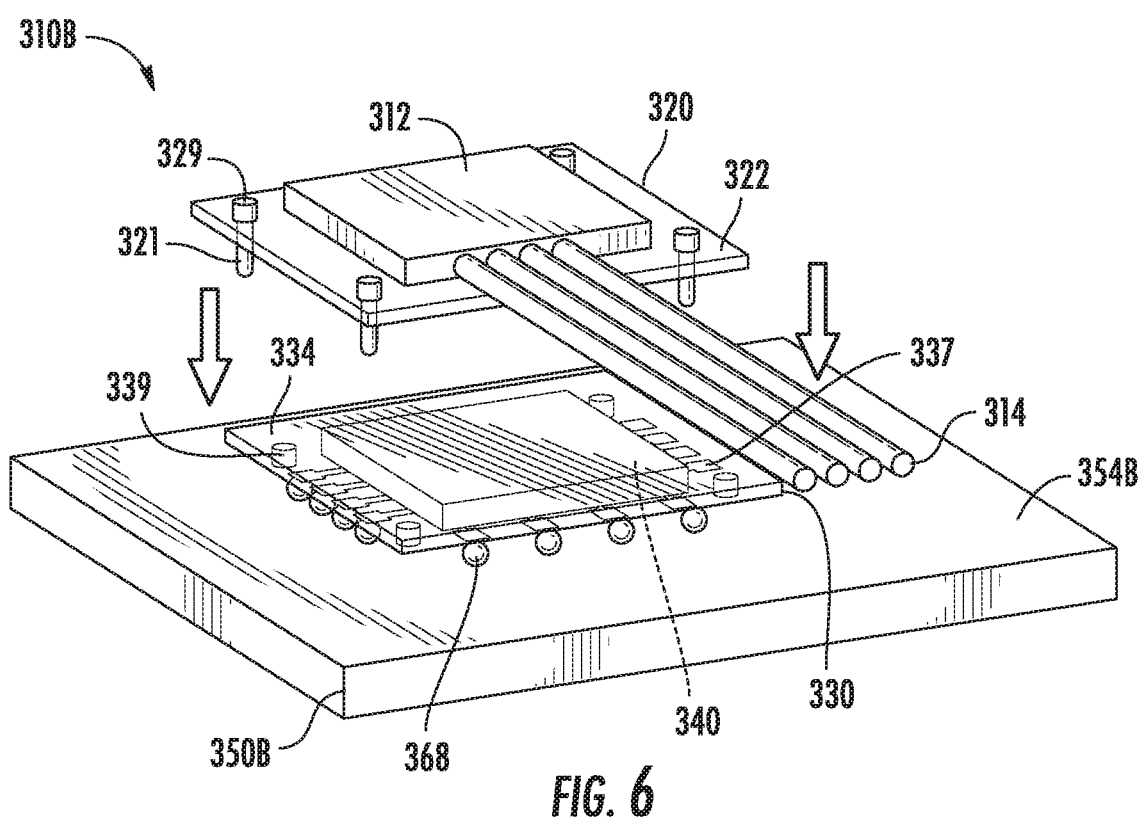
FIG. 6 is a partially exploded perspective view of a multi-fiber interface apparatus similar to that shown in FIG. 5A, but with solder balls arranged between the second substrate and the PCB.

FIG. 6 is a partially exploded perspective view of a multi-fiber interface apparatus 310B similar to that shown in FIG. 5A, with addition of solder balls 368 arranged between the second substrate 330 and the PCB 350B. Although not shown, it is to be understood that the PCB 350B may include electrical traces on the first surface 354 thereof, with the solder balls 368 being coupled to terminals associated with such traces. The multi-fiber interface apparatus 310B includes a fiber array coupling member 312 mounted to the first substrate 320, and a PIC 340 mounted to the second substrate 330 (with the PIC 340 optionally being arranged in a recess formed in the PCB 350B and/or a recess formed in the second substrate 330). The first substrate 320 includes opposing first and second surfaces 322, 324, with four holes 329 extending between the first and second surfaces 322, 324, and vertical pins 321 extending through the holes 329. The fiber array coupling member 312 is arranged along the first surface 322, with optical fibers 314 being received by the fiber array coupling member 312. The second substrate 330 includes opposing first and second surfaces 334, 336, with four holes 339 extending between the first and second surfaces 334, 336 and being configured to receive the vertical pins 321 when the first and second substrates 320, 330 are mated to one another. The PIC 340 and electrical traces 337 are provided along the second surface 336 of the second substrate 330. In certain embodiments, the vertical pins 321 may be formed of electrically conductive material and may be used to provide electrical interconnections.

In certain embodiments, a first substrate may be coupled with a fiber array coupling member, a second substrate may be coupled with a PIC, and the first and second substrates may be configured to laterally abut one another, with edges thereof serving as a passive substrate alignment feature.

Figure 7A:
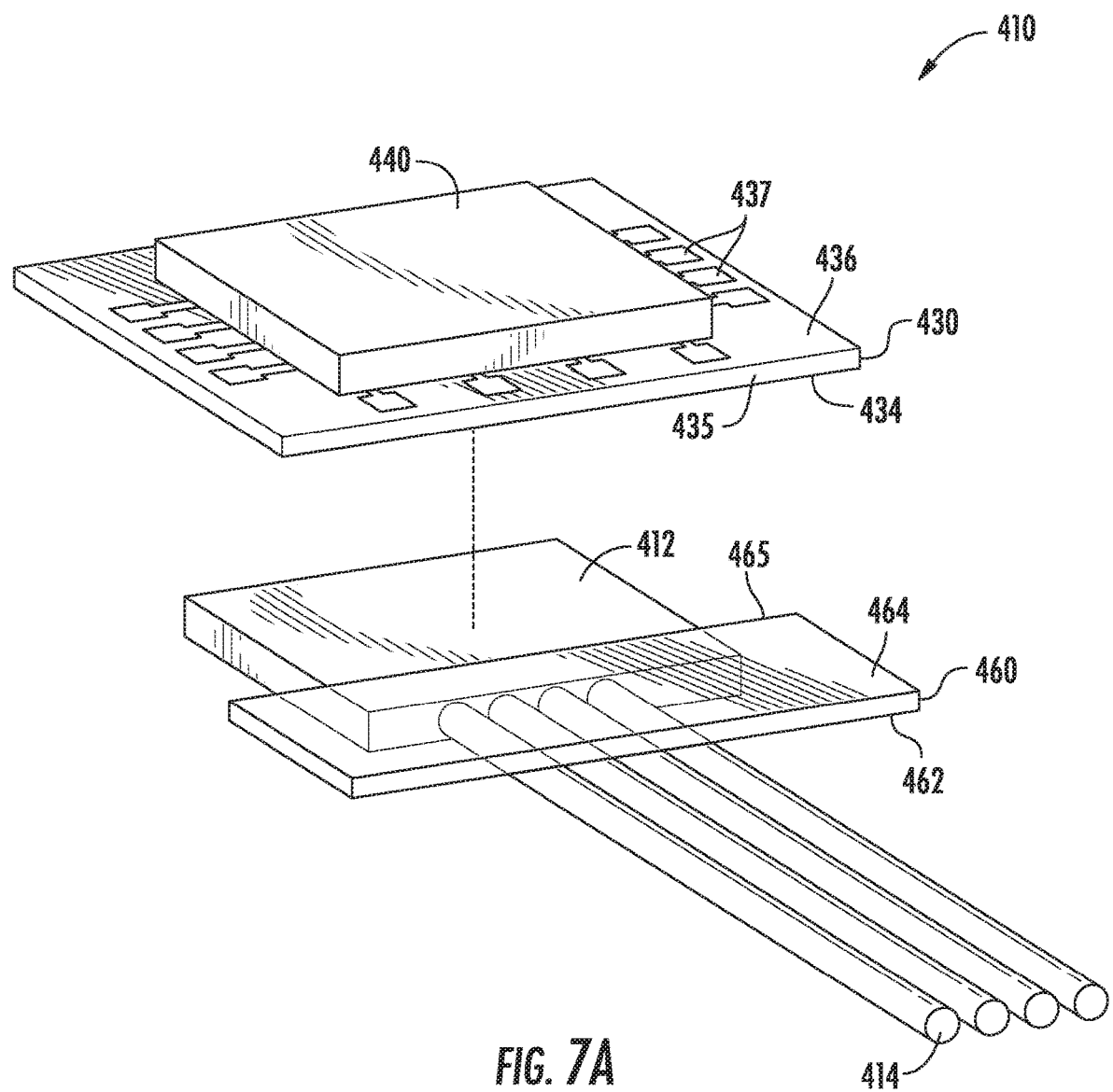
FIG. 7A is a partially exploded perspective view of a multi-fiber interface apparatus including a first substrate to which a fiber array coupling member is mounted, illustrated separately from a second substrate to which a PIC mounted to a substrate, with the first and second substrates being configured to laterally abut one another with edges thereof serving as a passive substrate alignment feature.
Figure 7B:
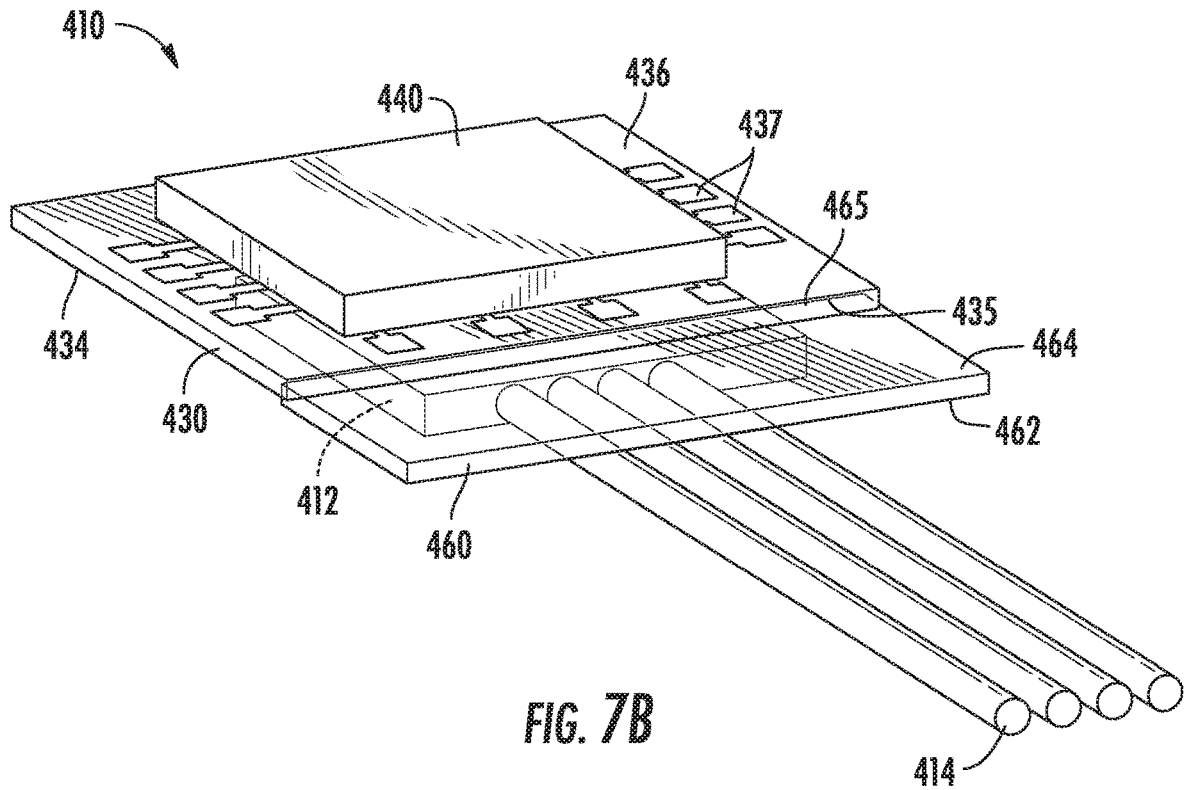
FIG. 7B is a perspective view of the multi-fiber interface apparatus of FIG. 7A following assembly, with lateral edges of the first and second substrates abutting one another to provide edge alignment utility.
Figure 7C:
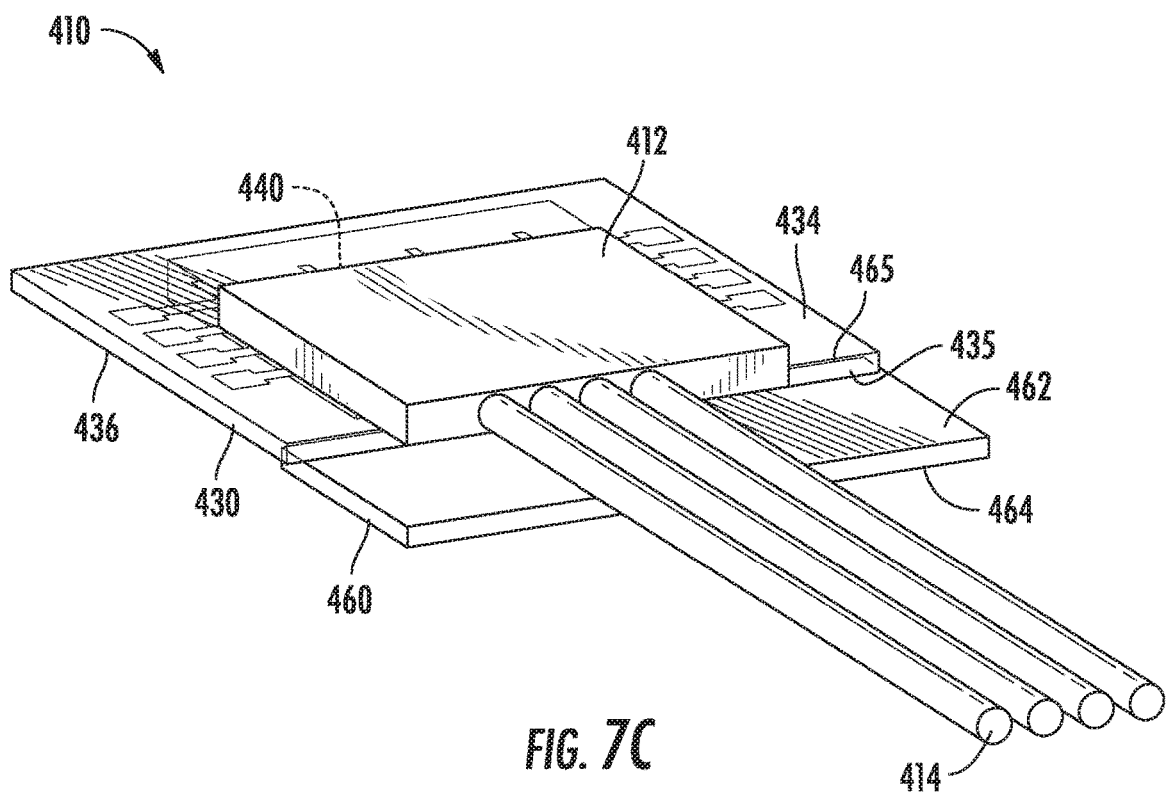
FIG. 7C is a perspective view of the multi-fiber interface apparatus of FIG. 7B, flipped vertically relative to the view shown in FIG. 7B.

FIGS. 7A-7C illustrate a multi-fiber interface apparatus 410 including first and second substrates 460, 430 configured to laterally abut one another along respective edges 465, 435 thereof, with FIG. 7A being a partially exploded perspective view and with FIGS. 7B and 7C being perspective views of the assembled multi-fiber interface apparatus 410. The first substrate 460 includes a first surface 462 and an opposing second surface 464, with an edge 465 bounding portions of the first and second surfaces 462, 464. A fiber array coupling member 412 is mounted to a portion of the first surface 462, with a portion (e.g., a majority or major portion) of the fiber array coupling member 412 extending beyond the edge 465 of the first substrate 460. Multiple optical fibers 414 are coupled with the fiber array coupling member 412. The second substrate 430 includes a first surface 434 and an opposing second surface 436, with an edge 435 bounding portions of the first and second surfaces 434, 436. Electrical traces 437 and a PIC 440 are arranged on the second surface 436 of the second substrate 430, with the PIC 440 being illustrated as positioned over a central portion of the second substrate 430. As shown in FIGS. 7B and 7C, when the multi-fiber interface apparatus 410 is assembled, the second substrate 430 is positioned between the PIC 440 and the portion of the fiber array coupling member 412 extending beyond the edge 465 of the first substrate 460, with the first surface 434 of the second substrate 430 contacting the fiber array coupling member 412, and with the respective edges 465, 435 of the first and second substrates 460, 430 abutting and arranged in contact with one another. The edge-contacting relationship between the first and second substrates 460, 430 promotes alignment between the first and second substrates 460, 430. In certain embodiments, the edges 465, 435 of the first and second substrates 460, 430 may additionally one or more registration features, such as complementary protrusions and/or recesses of the edges, to provide an additional degree of alignability between the substrates 460, 430. Although not specifically shown in FIGS. 7A-7C, it is to be appreciated that any suitable optical elements (e.g., beam turning elements, mirrors, lenses, collimators, etc.) may be provided by or between the substrates 460, 430, the fiber array coupling member 412, and/or the PIC 440 to provide double reflection expanded beam optical paths for transmitting beams between the optical fibers 414 and the PIC 440.

In certain embodiments, one or more protruding edge features of one substrate may be configured to cooperate with one or more edge surfaces of another substrate to promote passive substrate alignment between first and second substrates of a multi-fiber interface apparatus.

Figure 8:
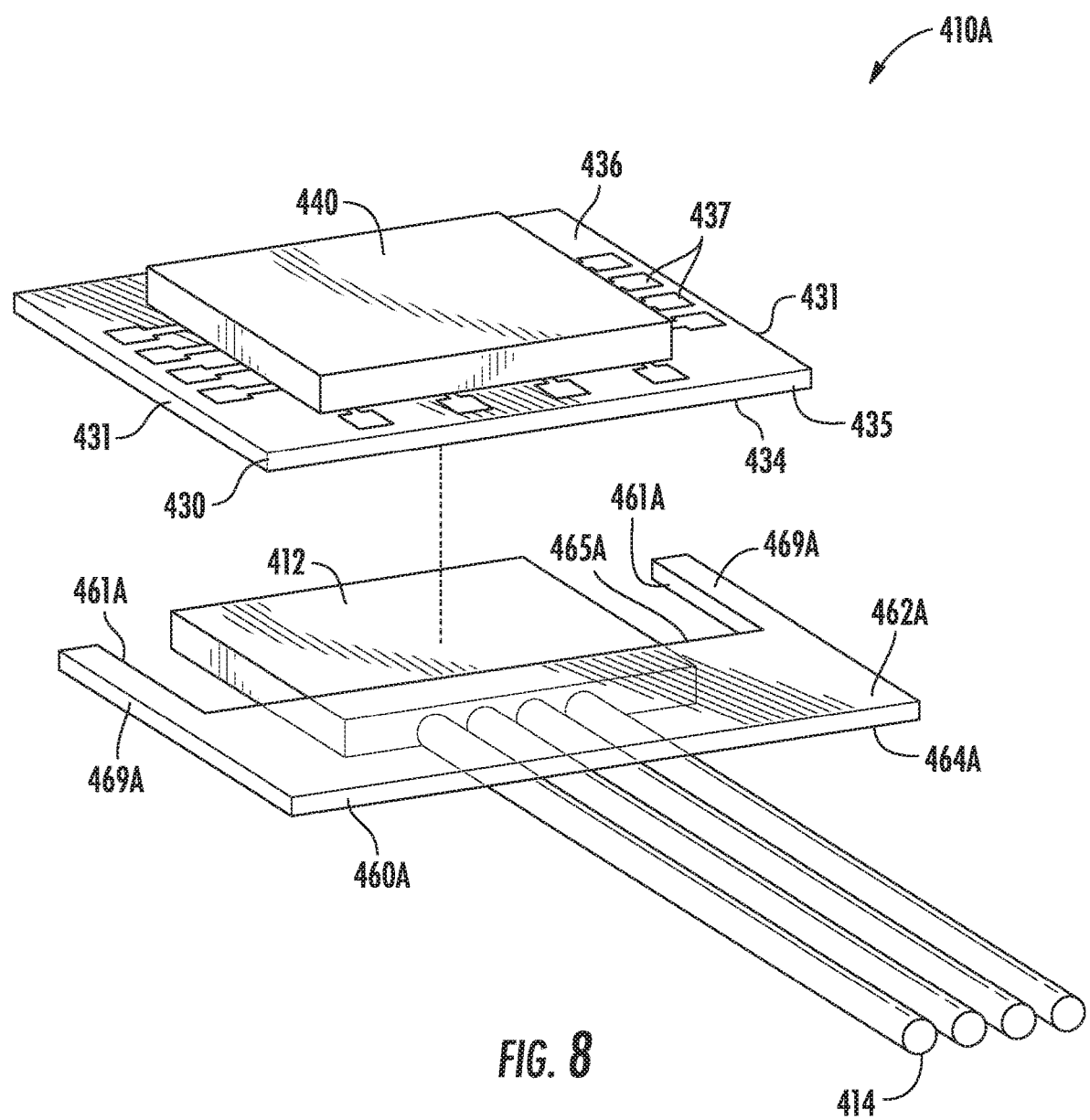
FIG. 8 is a partially exploded perspective view of a multi-fiber interface apparatus similar to that shown in FIG. 7A, including a U-shaped first substrate to which a fiber array coupling member is mounted, illustrated separately from a second substrate to which a PIC is mounted, with the U-shaped first substrate being configured to receive and abut lateral edges of the second substrate to promote edge alignment therebetween.

FIG. 8 is a partially exploded perspective view of a multi-fiber interface apparatus 410A similar to the apparatus 410 that shown in FIG. 7A, but including a U-shaped first substrate 460A to which a fiber array coupling member 412 is mounted, with the U-shaped first substrate 460A being configured to receive and abut lateral edges of the second substrate to promote edge alignment between the respective substrates 460A, 430. The first substrate 460A includes a first surface 462A and an opposing second surface 464A, with a first edge 465A bounding portions of the first and second surfaces 462A, 464A. The first substrate 460A also includes two projecting portions 469A each having a second edge 461A that may be arranged substantially perpendicular to the first edge 465A. A fiber array coupling member 412 is mounted to a portion of the first surface 462A, with a portion (e.g., a majority or major portion) of the fiber array coupling member 412 extending beyond the first edge 465A of the first substrate 460A. Multiple optical fibers 414 are coupled with the fiber array coupling member 412. The second substrate 430 includes a first surface 434 and an opposing second surface 436, with first and second edges 435, 431 bounding portions of the first and second surfaces 434, 436. Electrical traces 437 and a PIC 440 are arranged on the second surface 436 of the second substrate 430, with the PIC 440 being illustrated as positioned over a central portion of the second substrate 430. When the multi-fiber interface apparatus 410A is assembled, the second substrate 430 is to be positioned in an edge-contacting relationship with the first substrate 460 to promote alignment between the first and second substrates 460, 430, in which the first edges 465A, 435 contact one another, and in which the second edges 469A, 431 contact one another. The edge-contacting relationship between the first and second substrates 460A, 430 promotes alignment between the first and second substrates 460A, 430 in two directions. Although not specifically shown in FIG. 8, it is to be appreciated that any suitable optical elements (e.g., beam turning elements, mirrors, lenses, collimators, etc.) may be provided by or between the substrates 460A, 430, the fiber array coupling member 412, and/or the PIC 440 to provide double reflection expanded beam optical paths for transmitting beams between the optical fibers 414 and the PIC 440.

Details of fiber array coupling members according to various embodiments will now be described in connection with FIGS. 9 to 13.

Figure 9:
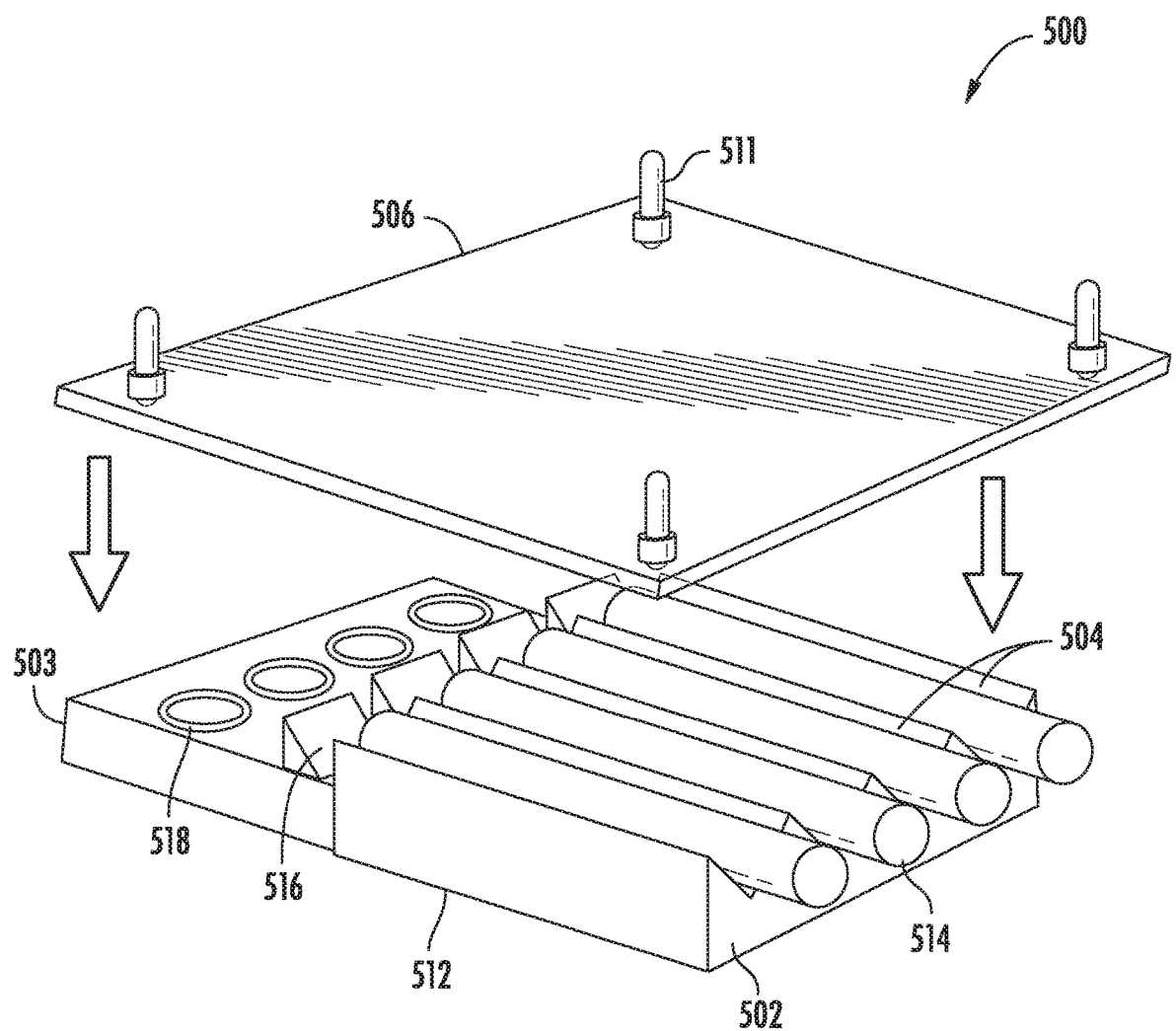
FIG. 9 is a partially exploded perspective view of a fiber array coupling member and a substrate of a multi-fiber interface apparatus according to one embodiment, with the fiber array coupling member including a V-groove array receiving a plurality of optical fibers, a plurality of turning mirrors, and a plurality of curved mirrors.

FIG. 9 is a partially exploded perspective view of a fiber array coupling member 500 and a substrate 596 of a multi-fiber interface apparatus according to one embodiment. The fiber array coupling member 500 includes a body 512 having a first end 502 and a second end 503, with the body 512 defining a V-groove array 504 that receives a plurality of optical fibers 514. (Although the term "V-groove array" is used throughout this disclosure, it is to be appreciated that an array of grooves of any suitable shape, such as U-shaped grooves, may be used instead.) The fiber array coupling member 500 further includes a plurality of beam turning elements 516 (e.g., mirrors configured to reflect horizontal beams received from the optical fibers 514 in a vertical direction, such as upward according to the illustrated configuration), and includes a plurality of curved mirrors 518. The substrate 596 includes vertical alignment posts 511 arranged proximate to corners thereof, with the vertical alignment posts 511 being arranged to promote alignment between the substrate 596 (e.g., a first substrate) with another substrate (e.g., a second substrate, not shown) to which a PIC may be mounted. It is to be appreciated that the fiber array coupling member 500 may be used in conjunction with other components (e.g., a second substrate and/or PIC) providing an additional plurality of curved mirrors that may be arranged in optical paths between the beam turning elements 516 and the curved mirrors 518 to provide a double reflection expanded beam arrangement (as described previously herein) to promote optical coupling between the optical fibers 514 and a PIC. In use, optical beams supplied by the optical fibers are reflected upward by the plurality of beam turning elements 516, then reflected by structures not part of the fiber array coupling member 500 (e.g., a plurality of focusing mirrors, or a plurality flat mirrors in combination with focusing lenses (not shown)) to be received by the curved mirrors 518, and ultimate reflected to beam transduction areas of a PIC (not shown).

Figure 10:
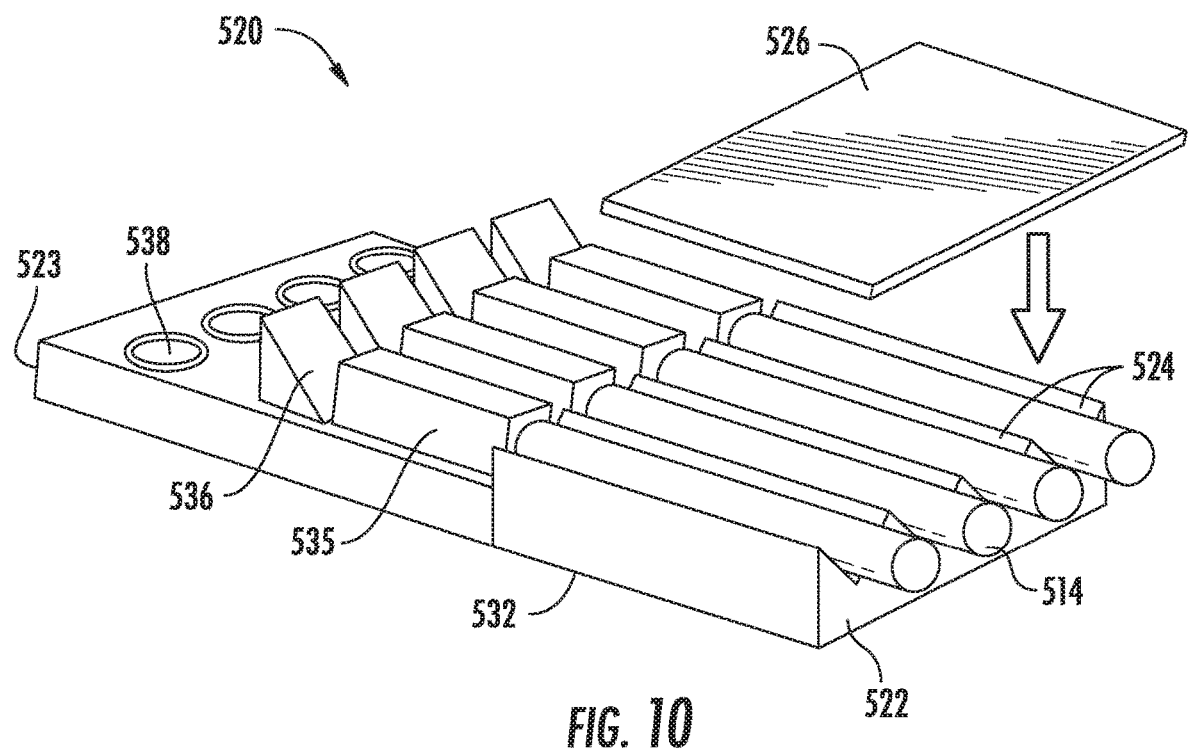
FIG. 10 is a partially exploded perspective view of a fiber array coupling member and a fiber array coupling cover of a multi-fiber interface apparatus according to one embodiment, with the fiber array coupling member including a V-groove array receiving a plurality of optical fibers, a plurality of beam collimating elements, a plurality of flat turning mirrors, and a plurality of curved mirrors.

FIG. 10 is a partially exploded perspective view of a fiber array coupling member 520 and a fiber array coupling cover 526 of a multi-fiber interface apparatus according to one embodiment. The fiber array coupling member 520 includes a body 532 having a first end 522 and a second end 523, with the body 532 defining a V-groove array 524 that receives a plurality of optical fibers 514. The fiber array coupling member 520 further includes a plurality of beam collimating elements 535 that are arranged between ends of the optical fibers 514 and a plurality of beam turning elements 536, with the beam collimating elements 535 serving to provide beams of enhanced luminance and/or uniformity for transfer between the plurality of optical fibers 514 and the plurality of beam turning elements 536. The plurality of beam turning elements 536 serve to reflect horizontal beams received from the collimating elements 535 in a vertical direction (e.g., upward according to the illustrated configuration). The fiber array coupling member 520 further includes a plurality of curved mirrors 538 that may provide focusing utility. The fiber array coupling member 520 may be used in conjunction with other components (e.g., a second substrate and/or PIC) providing an additional plurality of curved mirrors that may be arranged in optical paths between the beam turning elements 536 and the curved mirrors 538 to provide a double reflection expanded beam arrangement (as described previously herein) to promote optical coupling between the optical fibers 514 and a PIC.

Figure 11A:
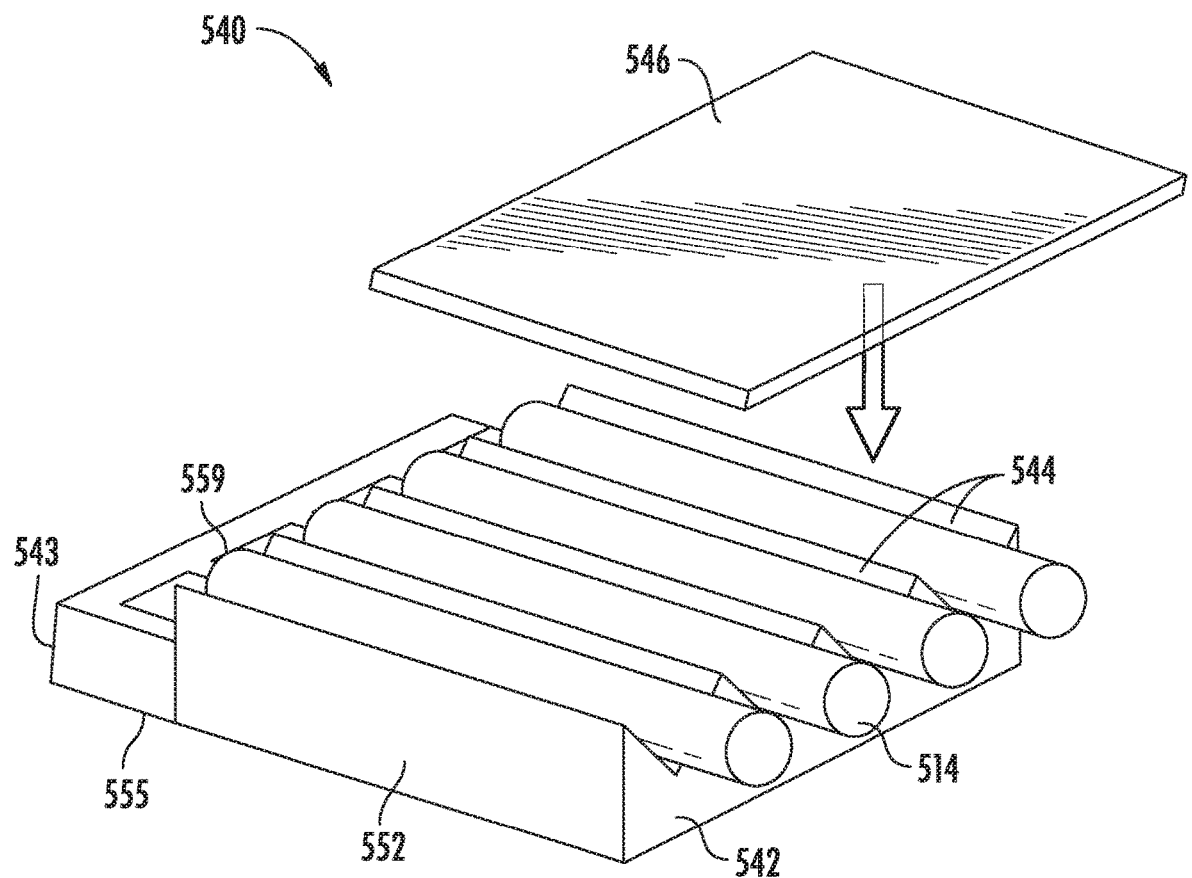
FIG. 11A is a partially exploded perspective view of a fiber array coupling member and a fiber array coupling cover of a multi-fiber interface apparatus according to one embodiment, with the fiber array coupling member including a V-groove array receiving a plurality of optical fibers having beveled ends coated with reflective material arranged to transmit beams through the body of the fiber array coupling.
Figure 11B:
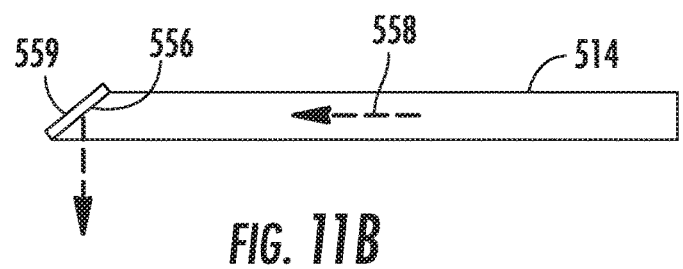
FIG. 11B is a side cross-sectional view of a portion of an optical fiber of FIG. 11A having a beveled end coated with reflective material.

FIG. 11A is a partially exploded perspective view of a fiber array coupling member 540 and a fiber array coupling cover 546 of a multi-fiber interface apparatus according to one embodiment. The fiber array coupling member 540 includes a body 552 having a first end 542 and a second end 543, with the body 552 defining a V-groove array 544 configured to be covered by the fiber array coupling cover 546. The V-groove array 544 receives a plurality of optical fibers 514 having beveled ends that are coated with reflective material 559 configured to reflect beams in a downward direction through a lower surface 555 of the body 552. As shown in FIG. 11B, each optical fiber 514 includes a beveled end 556 over which the reflective material 559 is coated, wherein the reflective material 559 is arranged to reflect a horizontal beam 558 from the optical fiber 514 in a vertical (e.g., downward) direction. In this manner, the beveled ends 556 and reflective material 559 of the optical fibers 514 shown in FIGS. 11A and 11B serve as beam turning elements that may be used in combination with focusing mirrors, or with flat mirrors and focusing lenses (not shown), to provide a double reflection expanded beam arrangement (as described previously herein) to promote optical coupling between the optical fibers 514 and a PIC. Depending on the beam turning angle provided by the beveled ends 556, if light is reflected via total internal reflection at the beveled ends 556, then the reflective material 559 may be omitted as being unnecessary.

Figure 12:
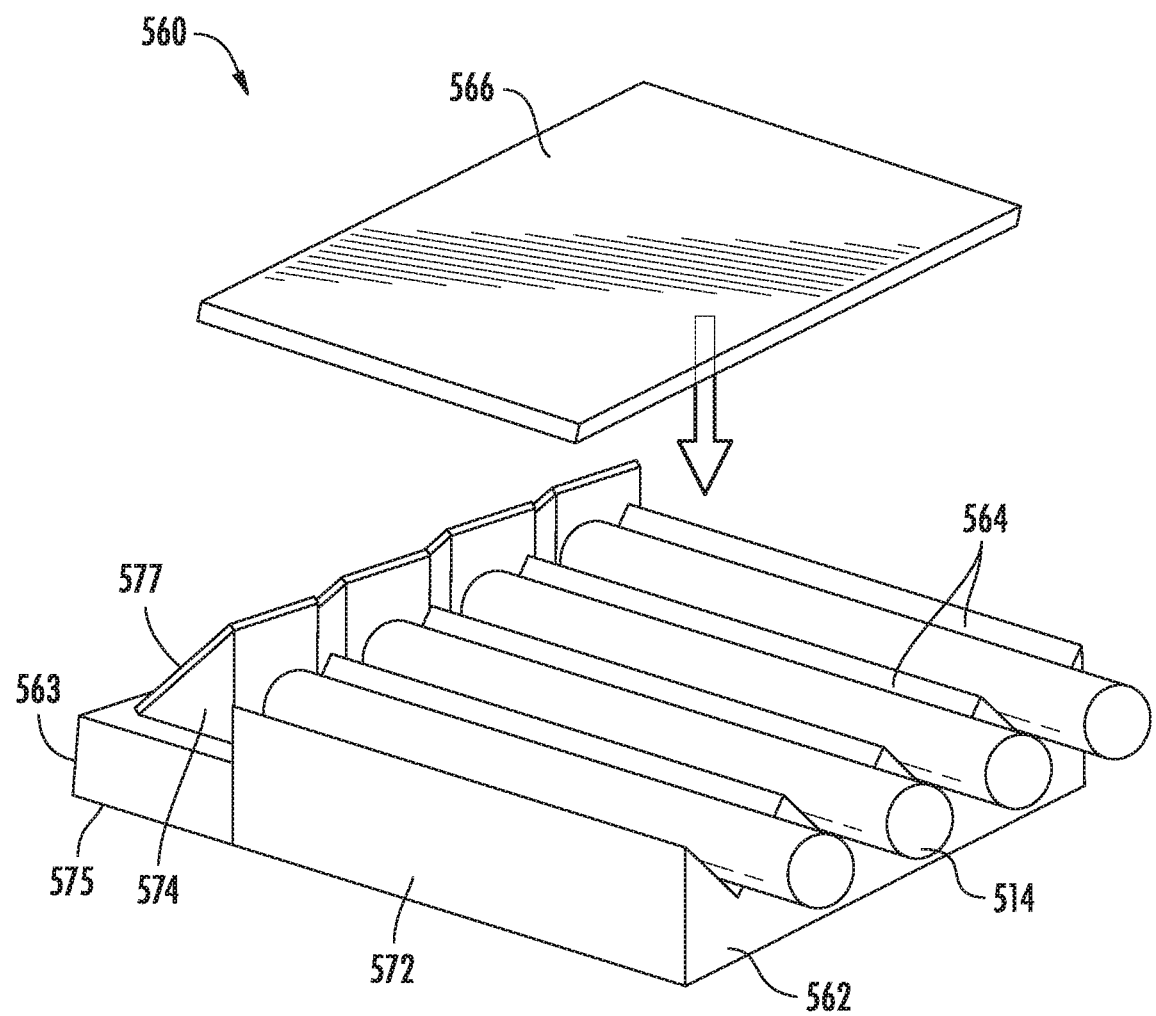
FIG. 12 is a partially exploded perspective view of a fiber array coupling member and a fiber array coupling cover of a multi-fiber interface apparatus according to one embodiment, with the fiber array coupling member including a V-groove array receiving a plurality of optical fibers and including a plurality of turning mirrors each including a prismatic element with a reflective surface.

FIG. 12 is a partially exploded perspective view of a fiber array coupling member 560 and a fiber array coupling cover 566 of a multi-fiber interface apparatus according to one embodiment. The fiber array coupling member 560 includes a body 572 having a first end 562 and a second end 563. The body 572 defines a V-groove array 564 configured to be covered by the fiber array coupling cover 566, with the V-groove array 564 receiving a plurality of optical fibers 514. Positioned downstream of the V-groove array 564 is a plurality of beam turning elements 574 each embodied in a prismatic element having a reflective surface 577, which may comprise a reflective coating. Each reflective surface 577 is arranged to reflect a horizontal beam received from a corresponding optical fiber 514 in a vertical (e.g., downward) direction through a lower surface 575 of the body 572. The fiber array coupling member 560 may be used in combination with focusing mirrors, or with flat mirrors and focusing lenses (not shown), to provide a double reflection expanded beam arrangement (as described previously herein) to promote optical coupling between the optical fibers 514 and a PIC.

Figure 13:
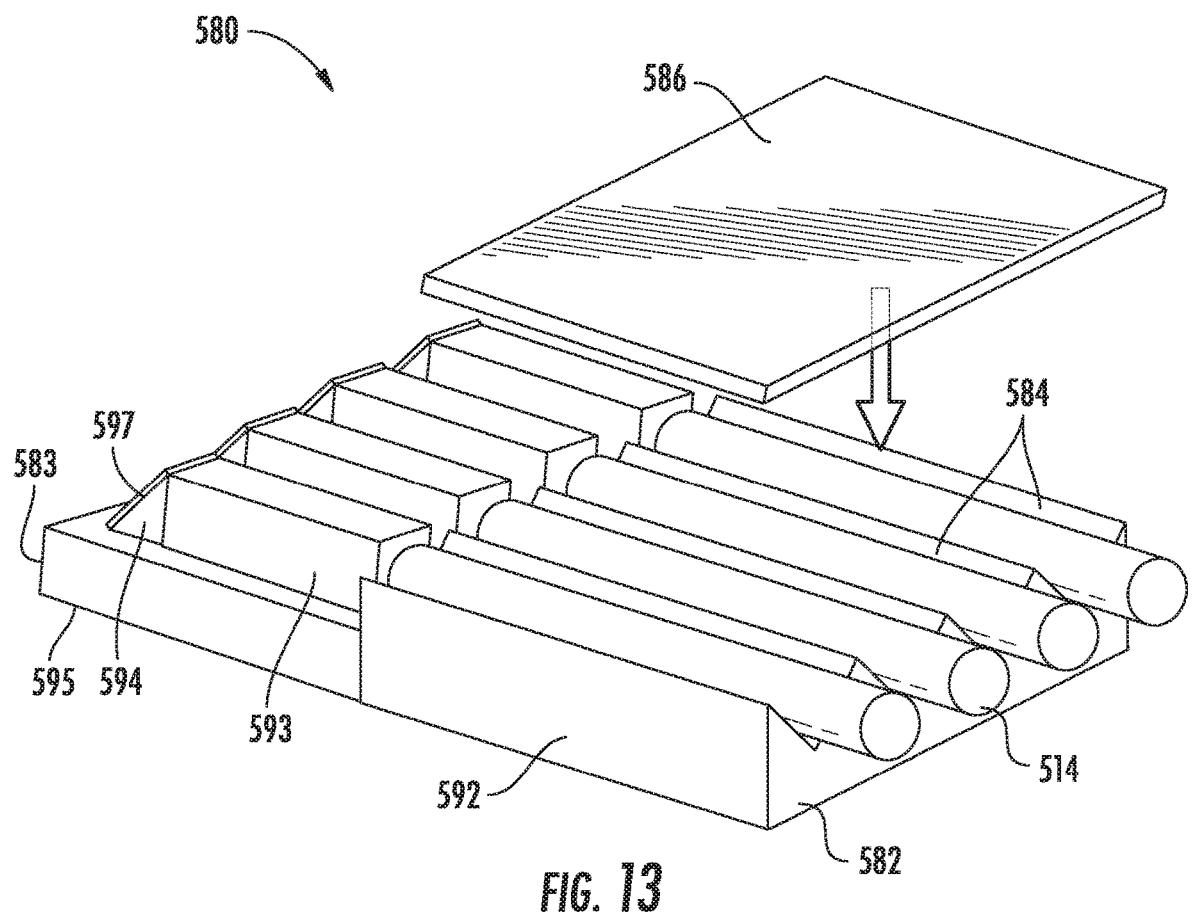
FIG. 13 is a partially exploded perspective view of a fiber array coupling member and a fiber array coupling cover of a multi-fiber interface apparatus according to one embodiment, with the fiber array coupling member including a V-groove array receiving a plurality of optical fibers, a plurality of beam collimating elements, and a plurality of turning mirrors each including a prismatic element with a reflective surface.

FIG. 13 is a partially exploded perspective view of a fiber array coupling member 580 and a fiber array coupling cover 586 of a multi-fiber interface apparatus according to one embodiment. The fiber array coupling member 580 includes a body 592 having a first end 582 and a second end 583. The body 592 defines a V-groove array 584 configured to be covered by the fiber array coupling cover 586, with the V-groove array 584 receiving a plurality of optical fibers 514. The fiber array coupling member 580 further includes a plurality of beam collimating elements 593 that are arranged between ends of the optical fibers 514 and a plurality of beam turning elements 594 each including a prismatic element having a reflective surface 597. Each reflective surface 597 is arranged to reflect a horizontal beam received from a corresponding optical fiber 514 in a vertical (e.g., downward) direction through a lower surface 595 of the body 592, with the beam collimating elements 593 serving to provide beams of enhanced luminance and/or uniformity for transfer between the plurality of optical fibers 514 and the plurality of beam turning elements 594. The fiber array coupling member 580 may be used in combination with focusing mirrors, or with flat mirrors and focusing lenses (not shown), to provide a double reflection expanded beam arrangement (as described previously herein) to promote optical coupling between the optical fibers 514 and a PIC.

Various features of the fiber array coupling members 500, 520, 540, 560, 580 may be fabricated by any methods known in the art or disclosed herein, such as photolithographic patterning followed by selective material removal (e.g., chemical etching, reactive ion etching, laser ablation, or other microscale removal techniques), stamping (e.g., including precision hot glass pressing) and/or other techniques, wherein certain features may optionally be provided by precision pick-and-place techniques. In certain embodiments, all optical elements of first and second substrates of a fiber array coupling member may be fabricated by the same type of process (e.g., stamping, or lithographic patterning and material removal) to optimize alignment between optical features.

In certain embodiments, multi-fiber interface apparatuses that include multiple substrates may include substrates incorporating a feature (e.g., fiducials) to enable vision-based alignment between substrates in combination with features to enable mechanical-based alignment between substrates, preferably with better than 5 µm, 3 µm, or 1 µm tolerance.

In certain embodiments, various components of a multi-fiber interface apparatus may be arranged within a surrounding mechanical fixture to maintain the components in proper alignment, and various means may be applied to maintain the contact. In certain embodiment, spring force, clamping arrangements, adhesives, and/or passivation material, may be used to maintain the contact and/or alignment between components of a multi-fiber interface apparatus.

In certain embodiments, any suitable number of optical fibers (e.g., 1, 2, 3, 4, 6, 8, 10, 12, 16, 24, 32, 48, 72, 96, 144, may be used with one or more fiber array couplings and/or multi-fiber interface apparatuses as disclosed herein.

In certain embodiments, a multi-fiber interface apparatus serves as or embodies a true surface connector (i.e., not an end connector) that maintains an extremely low profile. In certain embodiments, the profile of a multi-fiber interface apparatus as disclosed herein (e.g., including one or more substrates in combination with a fiber array coupling member) may be less than 1.5 mm, less than 1.0 mm, less than 0.7 mm, or less than another threshold disclosed herein, with any of the foregoing thresholds optionally being bounded by a minimum thickness of at least 0.2 mm, 0.3 mm, or 0.5 mm. Various embodiments disclosed herein may utilize single mode, multimode, and/or polarization-maintaining optical fibers.

In certain embodiments, multi-fiber interface apparatuses as disclosed herein are suitable for co-packaging and/or use with silicon (and silicon-based) photonic devices, since the interface apparatuses may leverage lithographically patterned features already present in these devices, thereby alleviating challenges such as facilitating high fiber density, enabling utilization with large numbers of fibers, avoiding undue system-level insertion loss, providing solder reflow compatibility, and/or facilitating optical disconnection and/or reconnection on optoelectronic packages (e.g., including but not limited to PCBs).

Although various embodiments refer to multi-fiber interface apparatuses as being intended for use with a PIC, the principles herein may be used with any optical connector intended for attaching optical emitters and/or optical detectors to one or more optical fibers. Examples of components that may be used with multi-fiber interface apparatuses disclosed herein include vertical cavity surface emitting lasers (VCSELs), photodiodes, integrated silicon photonic components, and the like.

Provision of a double reflection expanded beam arrangement using multi-fiber interface apparatuses disclosed herein facilitates relaxed alignment tolerances within the connector plane, thereby reducing cost and complexity of the resulting interface apparatuses relative to other solutions.

In certain embodiments, at least a PIC portion of a multi-fiber interface apparatus may be completely hermetically sealed, such as by using epoxy, silicone, or other passivation materials. Passivation materials and/or epoxy may also be used to protect optical surfaces (e.g., reflectors) and affix optical fibers in place. In certain embodiments, a multi-fiber interface apparatus and a PIC may also be solder reflow compatible.

In certain embodiments, a multi-fiber interface apparatus may include multiple rows of connectivity, in which a first plurality of optical fibers horizontally overlaps a second plurality of optical fibers, with both pluralities of optical fibers interfacing with a PIC.

Those skilled in the art will appreciate that other modifications and variations can be made without departing from the spirit or scope of the invention.

Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred. Moreover, where a method claim below does not explicitly recite a step mentioned in the description above, it should not be assumed that the step is required by the claim.

What is claimed is:

1. A multi-fiber interface apparatus for a photonic integrated circuit (PIC), the multi-fiber interface apparatus comprising:
    a first optically transmissive substrate having a first face and an opposing second face;
    a second optically transmissive substrate having a third face and an opposing fourth face, and being configured for mountably receiving the PIC, wherein the first optically transmissive substrate and the second optically transmissive substrate are arranged in a laterally abutting relationship, with at least one edge of the first optically transmissive substrate contacting at least one edge of the second optically transmissive substrate;
    a fiber array coupling member mounted to the first optically transmissive substrate and configured to receive a plurality of optical fibers, the fiber array coupling member comprising (i) a plurality of optical beam turning elements and (ii) a plurality of second mirrors; and
    at least one passive substrate alignment feature configured to align the first optically transmissive substrate and the second optically transmissive substrate to promote optical coupling between the plurality of optical fibers and the PIC.

2. The multi-fiber interface apparatus of claim 1, wherein the plurality of second mirrors comprises a plurality of second focusing mirrors.

3. The multi-fiber interface apparatus of claim 1, wherein the first optically transmissive substrate or the second optically transmissive substrate comprises a plurality of second focusing lenses arranged in an optical path between the plurality of second mirrors and the PIC.

4. The multi-fiber interface apparatus of claim 1, further comprising a plurality of first mirrors configured to reflect beams received from the plurality of optical beam turning elements toward the plurality of second mirrors.

5. The multi-fiber interface apparatus of claim 4, wherein first mirrors of the plurality of first mirrors are arranged in or on the second optically transmissive substrate.

6. The multi-fiber interface apparatus of claim 4, wherein the first optically transmissive substrate or the second optically transmissive substrate comprises a plurality of first focusing lenses arranged in an optical path between the plurality of first mirrors and the plurality of second mirrors.

7. The multi-fiber interface apparatus of claim 1, wherein the first optically transmissive substrate and the second optically transmissive substrate are arranged in a stacked relationship, with the second face abutting the third face.

8. The multi-fiber interface apparatus of claim 7, wherein the at least one passive substrate alignment feature comprises at least one protrusion or recess associated with the first optically transmissive substrate that is configured to mate with at least one recess or protrusion associated with the second optically transmissive substrate.

9. The multi-fiber interface apparatus of claim 1, wherein the at least one passive substrate alignment feature comprises a plurality of holes defined in one or more of the first optically transmissive substrate or the second optically transmissive substrate, and a plurality of pins configured to be received by the plurality of holes.

10. The multi-fiber interface apparatus of claim 9, wherein the at least one passive substrate alignment feature comprises at least one first registration feature of the first optically transmissive substrate that is configured to mate with at least one second registration feature of the second optically transmissive substrate.

11. The multi-fiber interface apparatus of claim 1, wherein the fiber array coupling member further comprises a plurality of passive fiber alignment features configured to align the plurality of optical fibers with the plurality of optical beam turning elements.

12. The multi-fiber interface apparatus of claim 11, wherein the plurality of passive fiber alignment features comprises at least one V-groove array.

13. The multi-fiber interface apparatus of claim 1, wherein the plurality of optical beam turning elements comprises a plurality of beam turning mirrors.

14. The multi-fiber interface apparatus of claim 13, further comprising a plurality of beam collimating elements arranged between the plurality of optical fibers and the plurality of beam turning mirrors.

15. The multi-fiber interface apparatus of claim 1, wherein the plurality of optical beam turning elements comprises beveled ends of the plurality of optical fibers when the plurality of optical fibers are received by the fiber array coupling member.

16. The multi-fiber interface apparatus of claim 1, further comprising a printed circuit board defining a recess configured to receive the PIC, wherein the second optically transmissive substrate is mounted to the printed circuit board with the PIC received by the recess.

17. The multi-fiber interface apparatus of claim 1, further comprising a plurality of electrically conductive first vias defined through the second optically transmissive substrate, wherein the plurality of electrically conductive first vias are accessible along the third face.

18. The multi-fiber interface apparatus of claim 1, wherein the second optically transmissive substrate comprises a substrate recess configured to receive the PIC.

19. The multi-fiber interface apparatus of claim 18, further comprising a printed circuit board, wherein the second optically transmissive substrate is mounted to the printed circuit board with the PIC received by the substrate recess.

20. The multi-fiber interface apparatus of claim 1, further comprising a plurality of electrically conductive paths extending through both the first optically transmissive substrate and the second optically transmissive substrate.

21. The multi-fiber interface apparatus of claim 1, further comprising a secondary circuit member arranged over the first face of the first substrate.

\* \* \* \* \*